United States Patent [19]

Birney et al.

[11] 4,084,254
[45] Apr. 11, 1978

[54] DIVIDER USING CARRY SAVE ADDER WITH NONPERFORMING LOOKAHEAD

[75] Inventors: Richard Eugene Birney; Joel Calvin Leininger; George Phillips Taylor, all of Boca Raton, Fla.

[73] Assignee: International Business Machines Corporation, Armonk, N.Y.

[21] Appl. No.: 792,078

[22] Filed: Apr. 28, 1977

[51] Int. Cl.² ............................................. G06F 7/54
[52] U.S. Cl. ..................................... 364/766; 364/787
[58] Field of Search ............................... 235/164, 175

[56] References Cited

U.S. PATENT DOCUMENTS

| | | | |
|---|---|---|---|
| 3,378,677 | 4/1968 | Waldecker et al. | 235/164 |
| 3,621,218 | 11/1971 | Nishimoto | 235/164 |
| 3,700,875 | 10/1972 | Saenger et al. | 235/175 |
| 3,976,866 | 8/1976 | Motegi et al. | 235/175 X |

OTHER PUBLICATIONS

K. G. Tan, "Uniform 2 Bits Quotients Binary Division by Carry-Save Adders", IBM Tech. Disc. Bull., vol. 14, No. 11, 4-1972, pp. 3279-3281.

*Primary Examiner*—Jerry Smith
*Attorney, Agent, or Firm*—Charles P. Boberg

[57] ABSTRACT

A carry save adder (CSA) is adapted for use in dividing operations by providing it with a lookahead capability whereby it accurately predicts whether or not each of the proposed complemental subtractions in a division process could be successfully performed if actually attempted, and it actually performs only those subtractions that will not result in overdrafts. Each bit position of the carry save adder is arranged to receive sum, carry and data inputs and to furnish sum, carry, presum and precarry outputs. The sum and carry output bits are latched and remain undisturbed until the next complemental subtraction is performed. The presum and precarry bits are not latched and are fed into a lookahead logic network which analyzes the presum and precarry bit patterns derived from all of the CSA bit positions to determine rapidly by a logical trial procedure whether the divisor could be subtracted from the dividend or partial remainder value currently registered in the sum and carry latches of the CSA without causing an overdraft. While this trial procedure is in progress, the presum and precarry values may change without altering the latched sum and carry values. If the trial procedure indicates that a proposed complemental subtraction would be unsuccessful, then such subtraction will be skipped without actually being performed by the CSA, thus eliminating the necessity of determining whether overdrafts have occurred and correcting the overdrafts.

12 Claims, 12 Drawing Figures

RIGHT SHIFT

SHIFT SUM R1 AND CARRY L0

LEFT SHIFT

SHIFT SUM L1 AND CARRY L2

NORMAL ADD

SHIFT CARRY L1 AND SUM L0

LOOKAHEAD ADD

FIG. 6 CARRY SAVE ADDER (CSA) BIT POSITION N

FIG. 7
VALUE OF LOOKAHEAD $K_N$ FROM N'TH BIT POSITION OF CSA HAVING BIT POSITIONS 0 TO M:
$$K_N = \left|(PS_N \cdot PC_{N+1}) + (PS_N + PC_{N+1})K_{N+1}\right|_M^N,$$
$$\text{WHERE} \begin{cases} N \leq M \\ K_{M+1} = 0 \\ PC_{M+1} = 0 \end{cases}$$
VALUE OF CSA CARRYOUT LOOKAHEAD (COLA):
$$COLA = PC_0 \not\vee K_0,$$
WHERE $K_0$ = LOOKAHEAD FROM BIT POS. 0 (N=0)
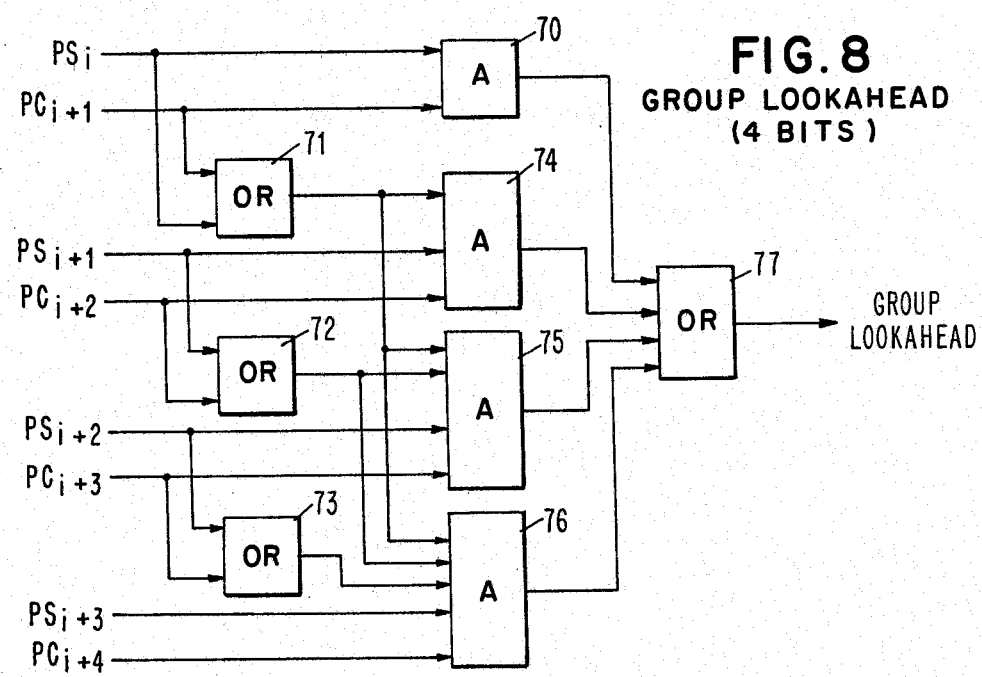
FIG. 8
GROUP LOOKAHEAD (4 BITS)
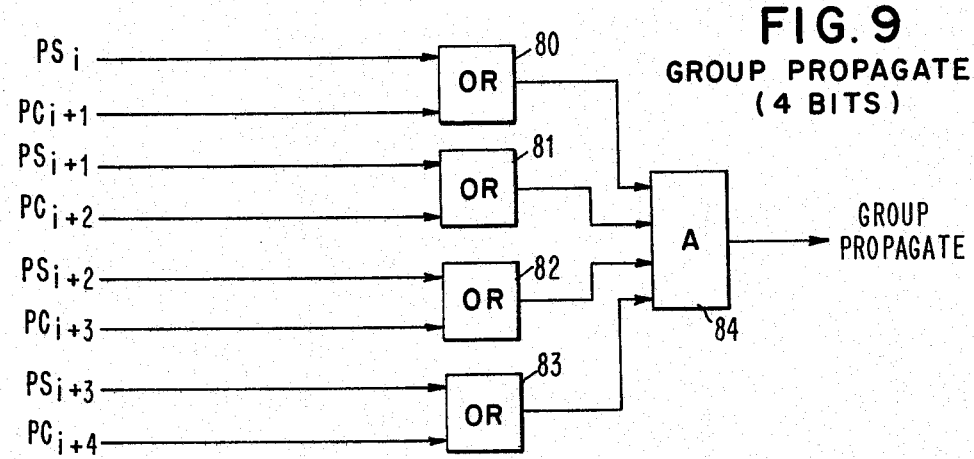
FIG. 9
GROUP PROPAGATE (4 BITS)

CSA LOOKAHEAD

FIG. 12 CSA BIT POSITION N

DIVIDER USING CARRY SAVE ADDER WITH NONPERFORMING LOOKAHEAD

CROSS-REFERENCE TO RELATED APPLICATIONS

Application, Ser. No. 792,082, filed of even date herewith, by J. C. Leininger and G. P. Taylor, entitled "Carry Save Adder", assigned to the assignee herein, describes and claims the carry save adder which is employed in the divider apparatus herein disclosed.

Application, Ser. No. 792,085, filed of even date herewith, by R. N. Ames, D. K. Hardin, J. C. Leininger and G. P. Taylor, entitled "System of Microcoded Data Processors Having Synchronous Microcode Generated Interface", assigned to the assignee herein, describes and claims the interface between a central processor and a floating point processor in which the present invention has been embodied.

The present application also is related to the following other applications assigned to the assignee herein, each of which was filed on Apr. 30, 1976:

| Serial No. | Title | Inventor(s) |
|---|---|---|
| 681,953 (now U.S. Pat. No., 4,047,161 issued Sept. 6, 1977) | Task Management Apparatus | M.I. Davis |
| 682,002 (Now U.S. Pat. No. 4,041,462, issued Aug. 9, 1977) | Data Processing System Featuring Subroutine Linkage Operations Using Hardware Controlled Stacks | M.I. Davis G.W. Mayes T.S. McDermott L.E. Wise |
| 681,983 (now U.S. Pat. No. 4,038,641, issued July 26, 1977) | Common Polling Logic for Input/Output Interrupt or Cycle Steal Data Transfer Requests | M.A. Bouknecht D.G. Bourke L.P. Vergari |
| 682,229 (now U.S. Pat. No. 4,038,642, issued July 26, 1977) | Input/Output Interface Logic for Concurrent Operations | M.A. Bouknecht M.I. Davis L.P. Vergari |

Each of the foregoing applications is incorporated herein by reference as if it were set forth herein in its entirety.

BACKGROUND OF THE INVENTION

This invention relates to arithmetic units for high speed data processors and particularly to the multiply/divide features of such units.

In a data processor which has multiply/divide circuitry, the multiplication process is performed essentially as a series of additions, and division is handled essentially as a series of subtractions, usually in the form of complemental subtractions. Multiplying operations commonly are speeded up by using carry save adders to perform the successive additions. A carry save adder operates in such a fashion that it does not immediately combine the carry bits with the basic sum bits (sometimes referred to as half-sum bits) that result from each addition but instead holds these sum and carry bits temporarily in separate registers until a subsequent time when they can be conveniently combined. This procedure saves the time that otherwise might be spent waiting for carries to be "rippled" or propagated through a long string of sum bits following each addition instead of being held in abeyance so as to permit the next cycle of multiplication to proceed.

In data processors that have divider units, the divider circuitry customarily employs some type of adder other than a carry save adder. As stated above, division involves a succession of subtractions usually performed as additions wherein one of the terms is inverted to complemental form. Each subtraction must be examined to ascertain whether it is "successful" or "unsuccessful" before the next subtraction can proceed. An unsuccessful subtraction is one which results in an overdraft because the subtrahend (i.e., the divisor in a division problem) is of greater magnitude than the true value of the minuend (i.e., the current remainder left from the preceding subtraction, if any, or the initial dividend value in the case of the first subtraction). The overdraft must either be anticipated and prevented by not actually performing the subtraction, or if the subtraction has been performed, it must be nullified by restoring the previous minuend value and correspondingly readjusting the value of the digit in the current order of the quotient value. It is considered preferable to anticipate an overdraft and prevent the subtraction from occurring rather than perform the subtraction and then have to restore the previous minuend value.

Adders that customarily are employed in dividers do not resemble the carry save adders commonly used in multipliers. A carry save adder deliberately withholds the effect of the carries that have been generated during a current addition step until the next addition step is performed. In principle this is opposed to a "lookahead" function, which would require that the effect of the carries resulting from one step in the arithmetic process be ascertained before the next step in that process is performed. Consequently, it has been the general practice to provide separate adders for the multiply and divide functions, using a carry save adder in the multiplier and a different type of adder, preferably one having lookahead capability, in the divider of the data processor. Hence, in conventional practice the provision of a dividing function makes the arithmetic unit of the processor much more costly and also requires the provision of extra space for an additional adder. Moreover, while a conventional lookahead adder will save some of the time that otherwise would be wasted in performing a futile subtraction and then countermanding it, such an adder does not utilize a completely "nonperforming" method but requires that some time be spent in actually performing at least part of the subtraction process, which time is wasted if the subtraction attempt is found to be unsuccessful.

SUMMARY OF THE INVENTION

A broad object of the present invention is to provide an improved high speed divider which effectively uses a carry save adder, thereby enabling the same adder to be utilized for performing division and multiplication.

Another object is to provide a nonperforming method of predicting from the sum, carry and divisor bit strings that are to be involved in each of the complemental subtraction phases of a carry save division process whether or not such subtraction would be successful, and preventing actual performance of that subtraction in the event of an unsuccessful prediction.

A further object is to provide means whereby these predictions can be accomplished by simple logical functions which require, on the average, much less time than that required to effect an actual addition of said bit strings by said adder.

A still further object is to provide a carry save adder of novel miniaturized design which is able to shift the bit strings stored therein to left or right as needed and simultaneously manifest different sets of sum and carry bits without requiring the use of dual adders, said carry save adder producing sum and carry bits which remain latched between clock pulses and also producing unlatched "presum" and "precarry" bits that can be used in novel lookahead logic circuitry to determine the results of a proposed addition without affecting the latched sum and carry values.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 7 is a statement of a mathematical function which is performed by the novel lookahead circuitry disclosed herein.

FIGS. 8–11 are logic diagrams showing various aspects of the lookahead circuit design and operation.

DETAILED DESCRIPTION OF A PREFERRED EMBODIMENT

Figure 1:
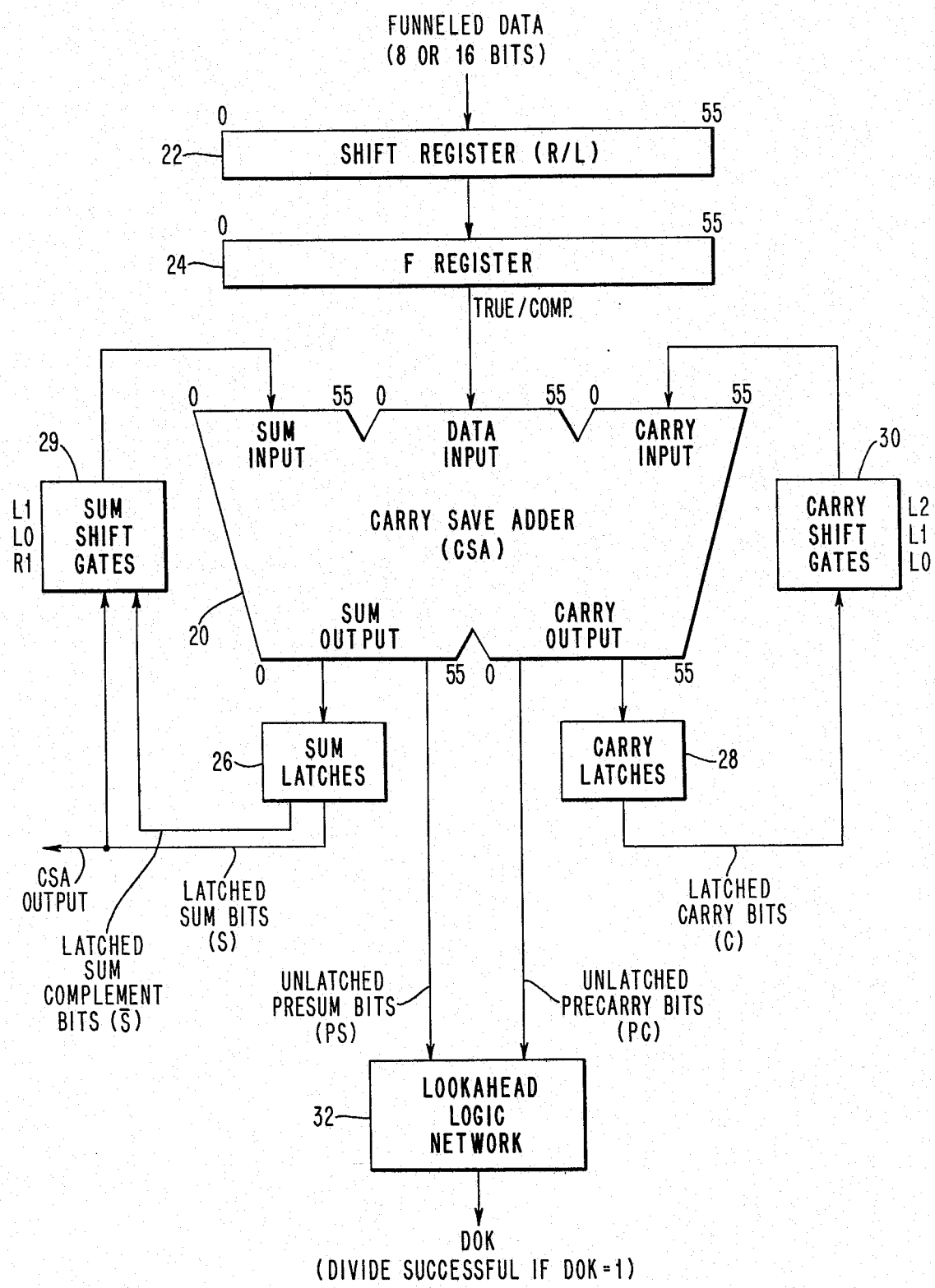
FIG. 1 is a diagram showing the general data flow paths in a processor embodying the invention.

Before giving attention to the details of the circuitry disclosed herein, the logical and arithmetical procedure for performing division in accordance with the principles of the invention will first be considered. Division is a process of successive subtractions during which an operand called the "divisor" is progressively subtracted from another operand, initially designated the "dividend", which is thereby reduced from its initial value through a series of intermediate minuends or partial remainder values of diminishing magnitudes until there is produced a final remainder of smaller value than the divisor, such final remainder being zero in the case where the dividend is an exact multiple of the divisor.

Even though the initial dividend may be of much greater magnitude than the divisor, there is no assurance that each of the partial remainder values will be of such magnitude that the divisor may be subtracted therefrom. Hence, it is not known initially whether an overdraft is or is not likely to occur in each of the succeeding subtraction steps. Whether or not a particular subtraction in the series will be successful or unsuccessful depends upon the particular bit pattern of the respective minuend that currently is involved in that subtraction. If a subtraction cannot be "successfully" performed (that is, if it cannot be performed without causing an overdraft), this fact preferably should be ascertained before the subtraction is attempted, so that the operation will proceed immediately to the next subtraction step (following the necessary column shifting action) without performing an unsuccessful subtraction.

The function of predicting overdrafts in a dividing operation has been handled in many different ways. As far as is known, no one heretofore has devised a means for performing this predictive function in an exactly accurate fashion when division is being accomplished by a complemental subtraction process using a carry save adder of the kind normally used in multiplying operations.

The use of a carry save adder to perform division will entail certain problems that are not encountered when such an adder is employed to perform multiplication (which is its conventional usage). In a multiplying operation the various addition steps generally may be performed without regard to the relative magnitudes of the operands involved therein, and no difficulty is caused by the fact that carry bits resulting from each addition may be held until the next addition is performed. In a dividing operation, however, the technique of saving the carries that result from a subtraction step performed in one cycle until the subtraction in the next cycle is performed will introduce complications into the problem of predicting whether this next subtraction can be successfully accomplished without an overdraft. Before considering such complications, attention will be given first to the problem of predicting overdrafts in general. Following this, the special problems introduced by the carry save technique will be considered. Inasmuch as division will be performed by a series of complemental subtractions, it is convenient to convert the dividend initially into ones-complement form and perform the division by successive addition of the divisor to a minuend which is already in complement form.

At the beginning of each new subtraction cycle of a dividing operation, there takes place a column shift which causes the current partial remainder value to be shifted to the left one bit position. At this point it should be explained that "left shift" is in effect a special form of addition with partial propagation of the carries, if any, and the unpropagated carries must be taken into account when determining the value of the left bit shifted out, as will be described later herein. If as a result of this left shift, and taking the unpropagated carries into account, a true "1" or complemental "0" bit at the high-order end of the remainder is moved to the left of the highest-order bit in the divisor, this fact indicates that a subtraction can be successfully performed, because then the true minuend value necessarily will exceed the divisor or subtrahend value. Hence, whenever the initial left shift causes a complement 0 to be shifted out of the current remainder to the left of the divisor, a successful subtraction is indicated, because even the highest possible divisor value will be less than the left-shifted remainder from which it is to be subtracted. However, if the remainder bit shifted out to the left of the divisor has a complement 1 or true 0 value, then the success of the subtraction cannot be assured, because the subtraction process may produce a highorder carryout, and under these circumstances an overdraft would occur.

In view of the foregoing, the prediction of a successful or unsuccessful subtraction also will have to take into account the possibility of a significant carryout from the bit position corresponding to the highest order of the divisor, because if this occurs, it will prevent a successful subtraction unless the highest-order bit of the minuend that was shifted out to the left of the divisor is a true 1 or complement 0. On the other hand, if there is no carryout (i.e., carryout bit = 0), the success of the subtraction is assured, because then no overdraft can occur even though the minuend bit to the left of the divisor is a true zero. Hence, if the carryout is true 1, the success of the subtraction will depend upon whether the minuend bit that has been shifted out to the left of the divisor is a true 1 (i.e., complement 0).

To recapitulate the foregoing, a successful subtraction is indicated when either of the following conditions is met:

1. The left shift of the complemental minuend value prior to the subtraction causes a complement 0 to be shifted out left; or
2. The addition of the complemental minuend and the divisor produces a carryout of 0.

Thus, it is evident that one can determine beforehand whether or not a proposed subtraction will be successful if a reliable way can be devised for ascertaining from the various bit patterns representing the complemental minuend and the subtrahend whether it would be possible to meet either condition 1 or condition 2 above.

If one wishes to accomplish this type of prediction when a carry save adder is being utilized to perform the complemental subtractions involved in a dividing operation, certain special problems must be met. Such problems arise from the fact that in a carry save adder some or all of the carries which are generated during any given subtraction cycle may have to be held until the next subtraction cycle is performed. Hence, the prediction of the value of the shifted-out bit and whether or not the next subtraction would be successful must take into account the effect of these saved or suspended carries. Heretofore it has been considered impossible to predict the success of subtractions with complete accuracy when these subtractions are being performed by a carry save adder. By using the analytical technique disclosed herein, however, such predictions can be made with complete reliability to prevent the performance of subtractions which for any reason would be unsuccessful, without impeding or significantly delaying the performance of those subtractions that can be successfully accomplished. This predictive capability is provided by novel circuitry which is shown in the drawings and described hereinafter.

Before considering the details of the circuitry involved in the predictive or lookahead process just mentioned, the various data flows involved in the relevant arithmetic operations will be described with reference to FIGS. 1 through 5. Following that description, the details of the carry save adder and its associated lookahead and shift circuitry will be described with reference to FIGS. 6 through 12, and some examples showing how the apparatus handles division problems will be considered.

FIG. 1 shows in block diagram form the portions of a processor including a carry save adder (CSA) 20 which are directly involved in the execution of the division procedure herein described. In practice the apparatus schematically represented in FIG. 1 has been incorporated in a floating point processor which utilizes the same adder 20 in the performance of multiplying, dividing and other arithmetic operations, such versatility being imparted to the CSA 20 by the novel features subsequently described herein, some of which are indicated in FIG. 1. Other parts of the floating point processor that are not germane to the present invention have been omitted from this showing.

In this connection it should be understood that the present invention is not limited in its application to floating point processors. It is in this type of processor that the utility of the invention has been most impressively demonstrated, but the principles of the invention could be usefully applied to fixed point processors as well.

In the particular processor under consideration, incoming data is funneled eight or sixteen bits at a time into a 56-bit shift register 22, which assembles the bits in their proper order starting from the highest-order bit position, designated 0 at the extreme left end, and progressing through the lower orders whose respective ranks are inversely related to the numbers of their bit positions. The full range of 56 bit positions is actively utilized only when operating in a double-precision mode.

The number stored in the shift register 22 is in due course transferred to a so-called "F register" 24, from whence it may be transferred in true or complement form to the data input terminals of the CSA 20. In general one of the operands is transferred from the F register 24 into the CSA 20, while the other operand is held in the F register for use as needed in the arithmetic process. In the division process described herein, the dividend is entered into the CSA 20 in ones-complement form at the beginning of the operation, and the divisor is held in the F register 24. As the division process is carried out, the initial dividend value is progressively reduced by complemental subtraction of the divisor therefrom, in the manner to be described, thereby forming a succession of partial remainder values of diminishing magnitudes.

As shown in FIG. 1, the carry save adder 20 is adapted to receive three types of inputs, namely, a sum input, a carry input and a data input. In some instances an input may comprise a string of zero bits. Three input strings are required, however, whether or not they represent significant values. The sum input is furnished by the sum output latches 26 (preferably part of the CSA 20, although shown separately therefrom in FIG. 1), which store the half-sum bits generated as the result of an addition performed by CSA 20. For convenience of description, these half-sum bits are herein referred to simply as "sum bits", and whenever this expression is used, it should be understood to mean sum bits which do not necessarily include the effects of carries generated by the addition and which in most instances are separate from such carries.

In similar fashion, the carry input to the CSA 20 is furnished by the carry output latches 28, which preferably are part of the CSA 20 although shown separately therefrom in FIG. 1. The carries generated by an addition are "saved"; that is to say, they are not immediately combined with the sum bits generated by that same addition. At least some of the carries generated in each cycle of a multiplying or dividing operation performed by the processor may be saved until the next cycle thereof. Whenever it is desired for any reason to combine carries with sum bits, these two sets of bits must be fed back into the CSA 20.

In many instances it is necessary that a string of output sum bits or output carry bits undergo a column shifting action before it re-enters the input side of the CSA. Shifting of the sum bit string is accomplished by sum shift gates 29 which, depending upon the circumstances, will effect a left shift or right shift of the sum bit string, or else no shift at all in the case of an add or complement function. Shifting of the carry bit string is accomplished by the carry shift gates 30 which, depending upon circumstances, will shift the carry bit string left two bit positions, left one bit position, or not shift it at all. Shortly there will be described herein the different situations in which each of these actions may take place. In the embodiment herein disclosed, the shift gates 29 and 30 actually are part of the CSA 20, although shown separately therefrom in FIG. 1.

As indicated above, it is optional insofar as the present invention is concerned whether the output latches 26 and 28 and the shift gates 29 and 30 are constructed as units separate from the CSA 20 or are internally built into the CSA 20. In the preferred embodiment which is described subsequently herein, the units 26, 28, 29 and 30 are incorporated into the CSA in a novel manner which enables certain parts of the CSA circuitry to perform dual functions, thereby achieving cost and size economy.

Whenever the F register 24 is gated to the data input terminals of the CSA 20 during the course of an arithmetic operation, it supplies as input thereto the data stored in this register, i.e., the second operand of the arithmetic process being performed. In the case of a dividing operation this second operand will be the divisor. If it is not desired that this operand be entered into the CSA, the F register is degated from the CSA, and the data entry will be a string of zeros under this condition.

Figure 6:
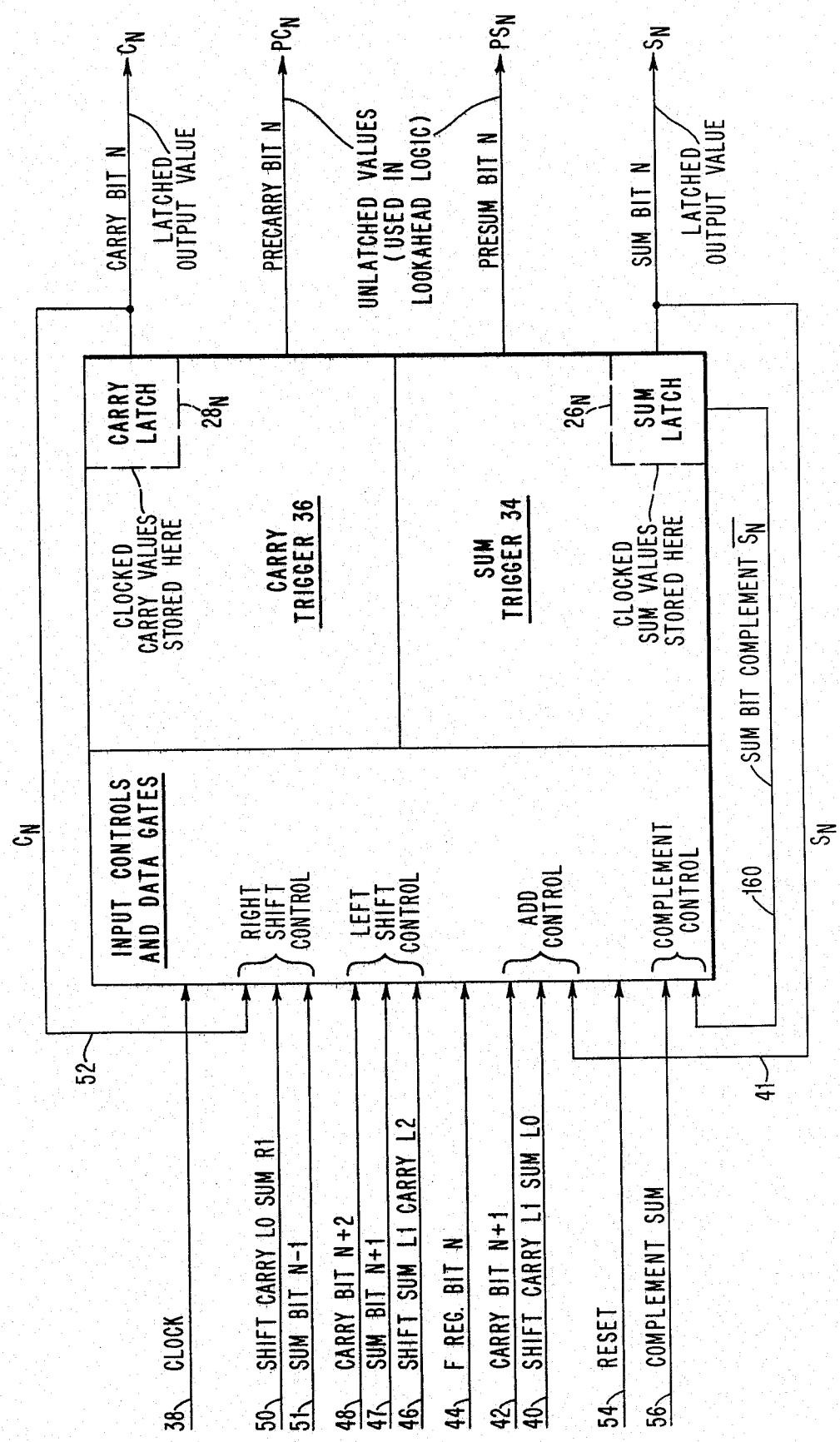
FIG. 6 is a general diagrammatic showing of a typical bit position in the carry save adder.
Figure 12:
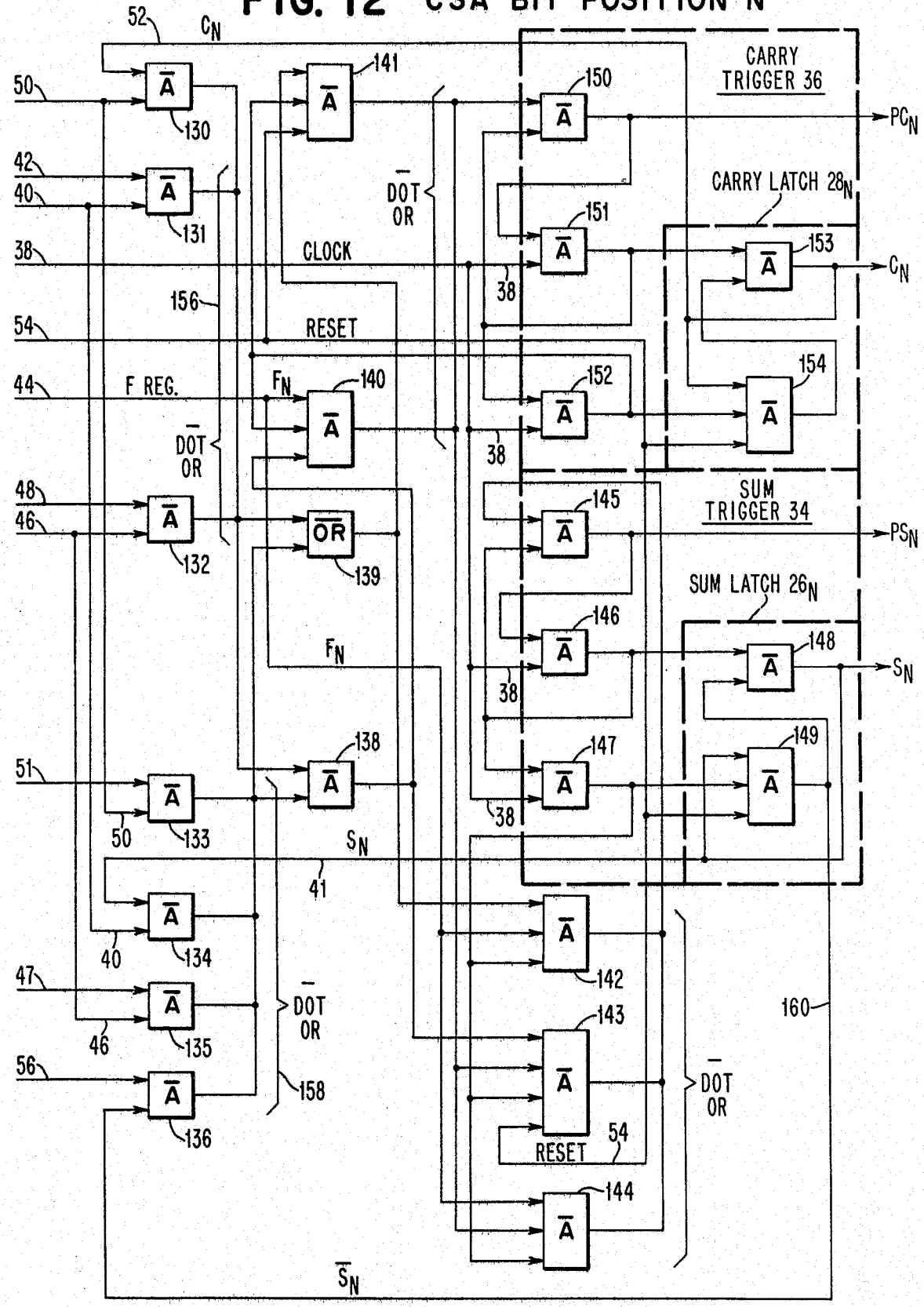
FIG. 12 is a logic diagram showing in greater detail the construction of the CSA bit position which is represented more generally in FIG. 6.

In FIG. 1 it has been indicated that the CSA 20 has a series of 56 bit positions, starting with the highest-order position 0 and ending with the lowest-order position 55, the numbering being inversely related to the order. FIGS. 6 and 12 respectively depict in block diagram and detailed circuit form the elements of a single bit position N in the CSA and the input/output conductors associated therewith. The same form of circuitry is provided at each of the other CSA bit positions. This circuitry will be described in detail presently.

It was mentioned above that the outputs of the CSA 20 will include sum bits that are latched and carry bits that are latched, and the CSA 20 also will furnish "presum" and "precarry" bits that are not latched, which is to say that the values of these presum and precarry bits may be changed under certain circumstances without altering the latched sum and carry values. Referring to FIG. 1, these unlatched presum and precarry bits (designated "PS" and "PC", respectively, to distinguish them from the latched sum and carry bits, S and C) are fed to a lookahead logic network 32 which analyzes the presum and precarry bit patterns by a recursive logical process to determine whether the divisor in the F register 24 may be subtracted from the current value of the partial remainder without causing an overdraft.

The lookahead procedure will be described in detail presently. It is designed to determine in a very rapid manner whether or not a proposed complemental subtraction can be validly performed and to prevent the subtraction from being carried through to completion if such attempt would be unsuccessful. That is to say, the projected output data that would result from an unsuccessful subtraction attempt will not be entered into the sum and carry output latches 26 and 28, and the machine cycle time will be shortened accordingly. The output of the network 32 is a DOK signal which is a "1" bit if the subtraction can be performed without an overdraft. Such a condition is known as a "divide successful" state of the lookahead. Using this lookahead method, unsuccessful subtractions will be anticipated every time, without exception.

Attention now will be given to the functions performed by the shift gates 29 and 30, FIG. 1, which as previously mentioned are actually incorporated into the structure of the CSA 20. Column shift functions are required in several instances during the course of a divide operation. Initially, if the respective magnitudes of the dividend and divisor are not in the proper relationship, the dividend will have to undergo a series of right shifts relative to the divisor. This will be explained more fully hereinafter, but briefly, if the leftmost hexadecimal character of the true dividend value exceeds the leftmost or only significant hexadecimal character of the divisor, then the dividend must be shifted to the right one hexadecimal position (i.e., four bit positions) relative to the divisor prior to the start of division. This function is known as "right alignment". The vacated bit positions to the left of the right-shifted dividend are filled with complement 1 (true 0) bits. There may be other instances where right shifting is required in order to align CSA output bits with the proper storage cell positions in memory.

When performed with a carry save adder, each right shift action requires that the sum (S) bits be shifted to the right one position without any shift of the carry (C) bits. This action is depicted on a small scale in FIG. 2, which represents the flow of data into and out of two adjoining CSA bit positions during a right shift. The legend "Shift Sum R1 and Carry L0" signifies that the sum bit in each CSA position, such as N-1, will transfer to the next higher-numbered (that is, next lower-ordered) position to the right, such as N. "L0" is the expression used herein to denote "no shift", and "Carry L0" means that the output carry bit from each CSA position will be fed back to the input side of that same CSA bit position. The F register is degated during a shift operation, so that a zero will be entered into the data input terminal of each CSA bit position. Thus, the inputs to each bit position during a right shift will consist of the sum bit from the next higher-ordered bit position (to the left), the carry bit from the present bit position and a zero data bit from the degated F register. These inputs are combined to provide new S and C outputs from each CSA bit position.

Figure 3:
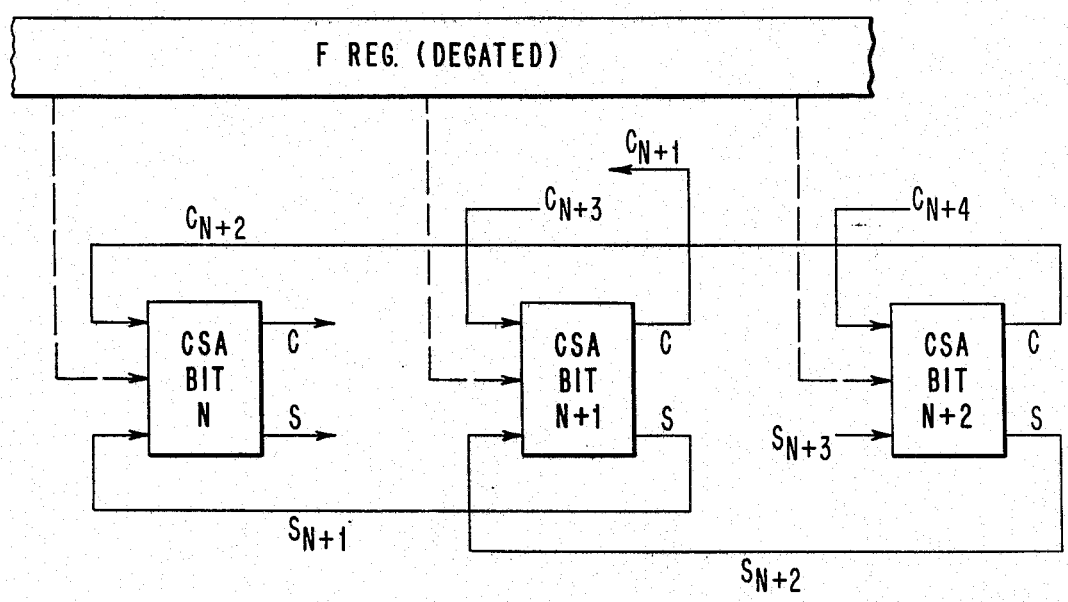

A left shift function, partially represented in FIG. 3, involves a left shift by one position of the sum bit from each CSA position and a left shift by two positions of the carry bit from each CSA position. This action is denoted by the legend "Shift Sum L1 and Carry L2". During a left shift, therefore, each CSA bit position such as N receives as inputs the sum bit from the next lower position such as N+1 and the carry bit from the second lower position such as N+2, along with a zero data bit from the degated F register. These inputs are combined to provide new S and C output values from each CSA bit position.

Figure 4:
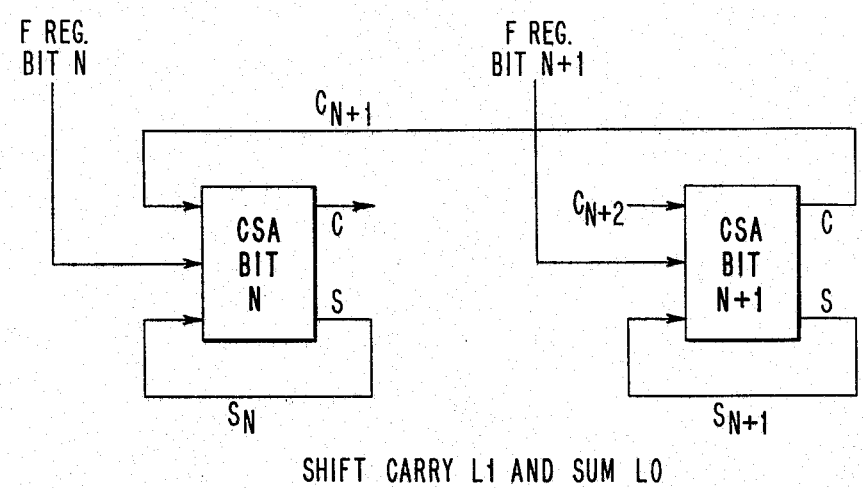

When a normal add function is to be performed, as partially represented in FIG. 4, the inputs to each CSA bit position such as N will consist of the sum bit S from that same position, the carry bit C from the next lower position such as N+1, and a data bit (in this case a divisor bit) from the corresponding position of the F register. New S and C values are produced as the result of this addition, these new values being clocked and stored in the sum and carry latches, respectively (FIG. 1).

Figure 5:
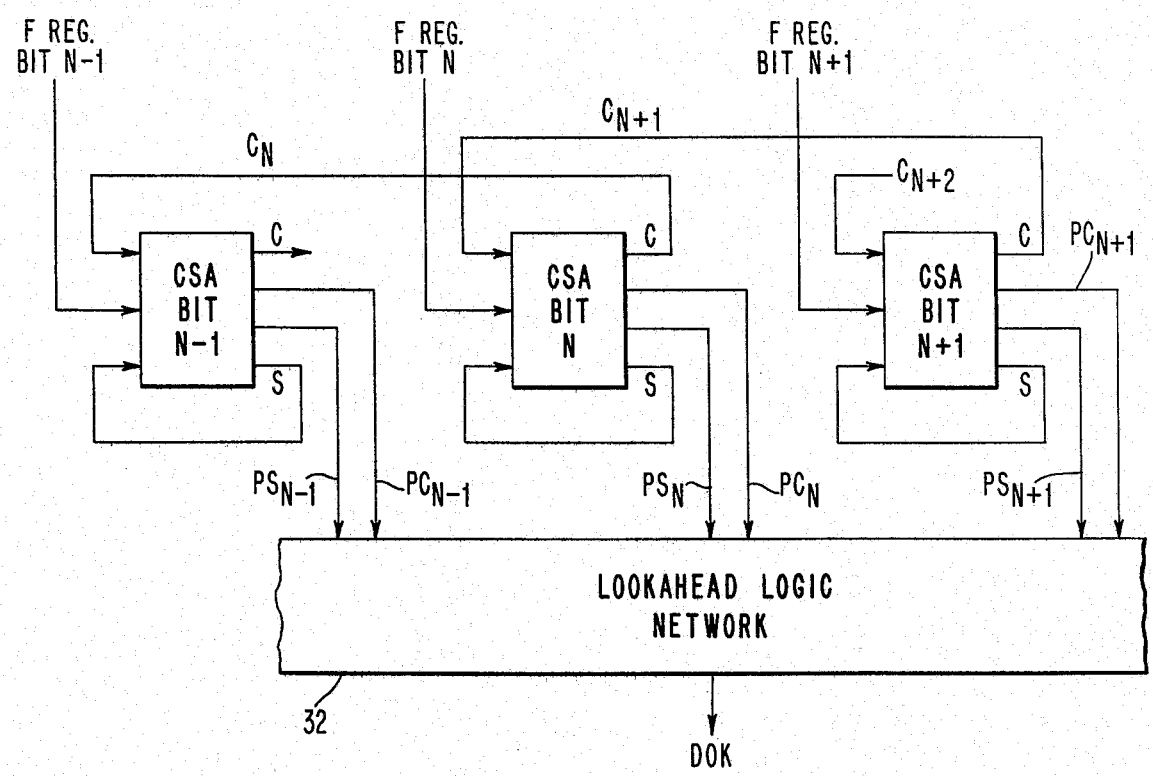

During lookahead functions (two types of which will be described herein) there is a preliminary step in which an add function is performed. In one type of lookahead, herein referred to as "Lookahead Following Shift", the initial addition step involves the same sum and carry inputs as shown in FIG. 4, except that the F register is degated from the CSA so that effectively only the $S_N$ and $C_{N+1}$ bits are added together at each bit position N. In the other type of lookahead, herein referred to as "Trial Subtraction with Divisor Gated to CSA", the initial adding step takes place as shown in FIG. 4, with the divisor (F register) gated to the CSA. This type of lookahead add function is depicted in FIG. 5. In either case, the useful outputs of the CSA bit positions will be the "presum" (PS) and "precarry" (PC) bits, which are fed into the lookahead logic network 32, to be described presently. The PS and PC values are not latched. However, the S and C values used as inputs to the CSA are latched and remain latched while the lookahead functions are being performed. The output of the network 32 is the DOK signal, which denotes by its 1 or 0 value whether the proposed subtraction could or could not be successfully performed.

FIG. 6 shows in diagrammatic form the preferred construction of each bit position in the carry save adder 20, FIG. 1. (This construction will be described at a more detailed level subsequently herein with reference to FIG. 12.) In each CSA bit position, FIG. 6, there are provided two D type edge-triggered flip-flops, hereinafter referred to as "edge triggers" or simply as "triggers", one being the sum trigger 34, and the other being the carry trigger 36. Each of the triggers 34 and 36, FIG. 6, contains a latch circuit which will store a value in response to a clock pulse. Thus, the sum trigger 34 has a sum latch $26_N$ which is included among the group of sum latches generally designated 26 in FIG. 1. The carry trigger 36 has a carry latch $28_N$ which is included among the group of carry latches generally designated 28 in FIG. 1. The CSA bit positions also have certain input controls which include the shift gates 29 and 30.

The trigger circuitry in each bit position of the carry save adder is arranged so that whenever a clock pulse is applied thereto, the latch portion of each trigger is set in accordance with the data inputs to that trigger which exist at the rising edge of the clock pulse, that is, at the instant when the voltage of the "clock" line 38, FIG. 6, is switching from low level to high level. The latch does not respond to data inputs which occur at times other than those instants when the rising edges of the clock pulses occur. Hence, each latch will preserve the bit value stored therein at the leading edge of one clock pulse at least until the leading edge of the next clock pulse, regardless of how the inputs may change during the interim. Thus, the output sum (S) and carry (C) bit values which are stored in the latches 26 and 28, FIG. 1, are stable between clock pulses.

The sum and carry triggers 34 and 36, FIG. 6, also furnish unlatched output values in the form of presum and precarry bits. At the rising edge of each clock pulse these unlatched presum (PS) and precarry (PC) values are identical with the sum (S) and carry (C) values respectively stored in the sum and carry latches, but during the time which intervenes between successive clock pulses the PS and PC bits may change their values in response to input data changes, whereas the values of the S and C bit will remain fixed during that interval regardless of changes in the input data values. As already mentioned, the PS and PC bits are used in the lookahead processes that are performed by the logic network 32, FIG. 1, which will be described in detail presently.

Shift functions of the kind depicted in FIGS. 2–5 and described hereinabove are performed in response to the pulsing of certain lines leading to the input controls of each CSA bit position, FIG. 6. As mentioned above, these controls include the sum shift gates and carry shift gates generally designated 29 and 30, respectively, in FIG. 1.

For example, when the CSA is to perform an add function (whether this is to be a normal addition as represented in FIG. 4 or an addition preceding a lookahead function as depicted in FIG. 5), a control line 40 designated "Shift Carry L1 Sum L0", FIG. 6, is energized. This conditions the circuitry in each bit position N of the CSA to receive a sum input over line 41 comprising the output sum bit $S_N$ furnished by the sum latch of that same CSA bit position N, together with a carry input over line 42 consisting of the carry bit from the output carry latch of CSA bit position N+1 (the next lower-order bit position). Depending upon conditions (as will be explained more fully hereinafter) there may or may not be a significant input from the N'th bit position of the F register over line 44 to the sum and carry triggers of the CSA bit position N. Where the divisor is being substracted from the value that currently is registered in the CSA, the F register is gated to the CSA. However, in those instances (described hereinafter) where addition is to be performed using sum and carry inputs only, without any significant input from the F register, then the F register is degated, thereby insuring that there will be a zero input from the F register line 44 at each of the CSA bit positions.

Figure 2:
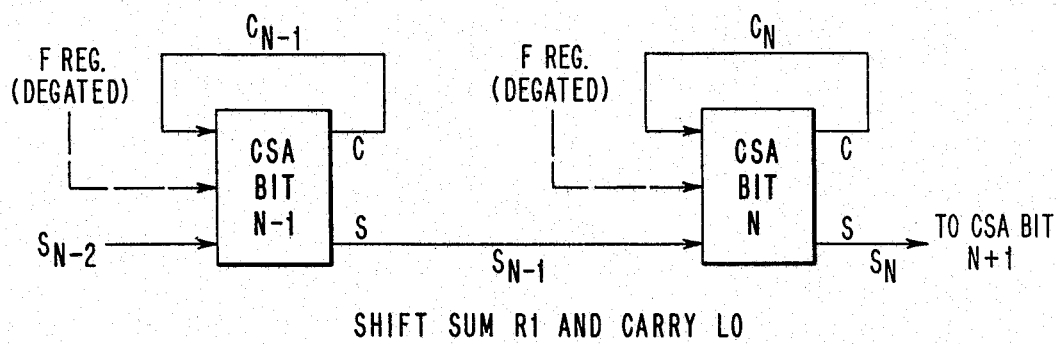
FIGS. 2–5 are simplified representations of the data flows involved in various shifting and adding functions which may be performed by the carry save adder (CSA) according to the invention.

Column shift functions are performed by this apparatus as special types of add functions. When the CSA is required to execute a shift of its contents to the left, this is done by shifting all latched sum bits S to the left one bit position and concurrently shifting all latched carry bits C to the left two bit positions, then adding the coincident sum and carry bits at each CSA bit position to produce new S and C output bits, with the F register being degated at this time, as indicated in FIG. 3. To execute a left shift, the control line 46 designated "Shift Sum L1 Carry L2", FIG. 6, is energized. This conditions each CSA bit position N to receive as inputs thereto, over lines 47 and 48, respectively, the latched sum bit from CSA bit position N+1 and the latched carry bit from CSA bit position N+2. To execute a right shift, the control line 50, FIG. 6, designated "Shift Carry L0 Sum R1" is energized, causing each CSA bit position N to receive as inputs thereto over lines 51 and 52, respectively, the latched sum bit from CSA bit position N-1 (the next higher-order position) and the latched carry bit from the same bit position N, with the F register being degated at this time. This right shift action also is depicted in FIG. 2.

At times when it is necessary to reset the sum and carry triggers at each bit position of the CSA to a zero state, a reset line 54, FIG. 6, is energized. If for any reason it is desired to invert the value stored in the CSA, a "Complement Sum" line 56, FIG. 6, is energized, thereby converting the bits stored in the sum latches of the CSA to their ones-complement values. The sum latches 26 of the CSA, FIG. 1, store the final result of an arithmetic operation performed by this adder, with the carry latches 28 storing zeros at the end of the final cycle in the process.

The foregoing has been a rather condensed description of the manner in which the carry save adder operates under various conditions. The internal functioning of this adder will be described later in connection with the more detailed showing in FIG. 12. Before proceeding to that more detailed description, however, attention will be given to the lookahead network 32, FIG. 1, which is an important aspect of the invention herein claimed.

The lookahead network 32 is designed to perform the logical functions depicted in FIGS. 7-11. To obtain a better understanding of these functions, consideration first will be given to the principles underlying the lookahead procedure. As previously explained, one can determine whether or not a proposed complemental substraction could be successfully performed if there is some reliable way of ascertaining whether either of the following events is possible under the existing circumstances:

(1) A left shift of the complemental minuend value registered in the CSA just prior to the substraction will cause a 0 bit to be shifted out of the leftmost CSA position, or:

(2) The relationship between the respective bit patterns of the left-shifted minuend and the divisor are such that addition of the divisor bits to the bits of the complemental minuend value aligned therewith will produce a carryout of 0. The lookahead network 32 makes both of these determinations by logical processes which do not involve any changes in the latched sum (S) and latched carry (C) bit values currently registered in the CSA 20.

Inasmuch as the "minuend value" is registered in a carry save adder (CSA 20) which separately stores sum and carry (S and C) bits, this minuend is represented jointly by a string of S bits and a string of C bits, and the two determinations defined in paragraphs 1 and 2 above must take this fact into account. The lookahead procedure which is about to be described effectively accomplishes the required lookahead functions notwithstanding the complexities introduced by the carry save method of performing addition.

First considering the "shift out left" aspect of the lookahead procedure (condition 1 above), it has been noted herein that the performance of each cyle in the division process is initiated by a left shift of the complemental minuend registered in the carry save adder. At the beginning of the division process this minuend is the ones-complement of the dividend. Thereafter it comprises the partial remainder (if any) that stands in the CSA at the end of each cycle after complemental subtraction of the divisor from the amount previously registered in the CSA (assuming that such a subtraction actually has occurred) or else the amount already registered in the CSA in the event that no subtraction has occurred in the cycle just performed. In any event, the minuend initially will appear to have a true value smaller than that of the divisor, and before a subtraction can be performed, the minuend must undergo a left shift in order to have the appropriate columnar alignment with the divisor. If the left shift causes a complement 0 (true 1) bit to be shifted out so that it stands to the left of the highest order of the divisor, this fact guarantees that no overdraft will occur when the divisor subsequently is subtracted from the left-shifted minuend; hence, when a 0 bit is shifted out left, this indicates that a successful subtraction can be performed in the cycle which has just commenced.

If the adder were of the type which completely combines the sum and carry bits following each addition, it would be a simple matter to determine the value of the leftmost bit in the resulting sum, but where a carry save adder is being utilized as in the present case, one cannot exactly determine what the leftmost sum bit really is without knowing what effect the saved carry bits would have had upon the value of the leftmost sum bit if these carries had been combined with the sum bits instead of being separated therefrom. In the apparatus herein disclosed this determination is made in two steps. First, the value of the leftmost bit currently stored in the CSA sum latches, here designated "$S_0$", and the value of the bit stored in the next lower-order position of the CSA carry latches, here designated "$C_1$", prior to a left shift, are applied to an exclusive-OR gate 60, FIG. 11, the output of which represents the value of the half-sum bit resulting from the logical addition of $S_0$ and $C_1$. This exclusive-OR output is applied to an AND gate 62, which passes the bit value $S_0 \veebar C_1$ to an OR gate 64 at a time determined by application of a timing pulse on a control line 63 to the AND gate 62. (The symbol "$\veebar$" represents the exclusive-OR function.) After passing through OR gate 64, the bit value $S_0 \veebar C_1$ is entered into a D type edge-triggered flip-flop 66, herein designated the "SUMOL trigger". "SUMOL" is an acronym for "sum bit out left". At this stage the SUMOL value is incomplete, because the value $S_0 \veebar C_1$ in itself is not necessarily the value of the leftmost sum bit that would have resulted if all of the carries had been fully propagated in subsequent addition cycles. Nevertheless, this preliminary $S_0 \veebar C_1$ value is entered into the SUMOL trigger 66, and at the appropriate time this value is clocked into the latch portion 67 of the trigger 66 by a gated clock pulse on control line 68, FIG. 11, so that it now becomes a latched value. It should be kept in mind that the $S_0$ and $C_1$ values involved in this phase of the procedure are the sum bit in position 0 and the carry bit in position 1 of the CSA prior to left shift of the CSA contents.

The edge trigger 66 may be of a standard design such as a Texas Instruments Series 54/74 or 74/74 flip-flop, which is composed of NAND gates appropriately arranged to perform an edge trigger function whereby the latch portion 67 is set in accordance with the bit value which is being applied to the trigger 66 through the OR gate 64 at the instant when the leading edge of a gated clock pulse is applied to trigger 66 through control line 68. Modifications of this design will be apparent to those skilled in the art. For instance, the trigger 66 and the circuitry for generating the exclusive-OR of $S_0$ and $C_1$ may have some elements in common. In this connection it should be mentioned that the logic diagrams shown in FIGS. 8-11 are second-level representations, and as will be appreciated by those skilled in the art, any or all of the gates and triggers shown therein could be represented by equivalent lower-level arrangements of NAND and/or NOR gates in accordance with well-know practice. The trigger 66 is not shown herein at this lower logic level, but the manner in which an edge trigger can be so represented will be indicated hereinafter in the description accompanying FIGS. 12-15, which show the internal configurations of the sum and carry triggers of the CSA.

In order to complete the determination of the SUMOL (sum bit out left) value, it is necessary to know what the value of the carryout would be if the sum and carry bits currently registered in the CSA following the left shift of its contents were combined. This is one of the functions of the lookahead logic circuitry shown in FIGS. 8-10, which soon will be described. It will be explained subsequently herein how the output of this lookahead circuitry is utilized in making the final SUMOL determination. Before this step can be described in detail, however, it is necessary to have an understanding of the manner in which the various carryout lookahead (COLA) values are determined by the logical circuitry shown in FIGS. 8-10. This circuitry responds to presum and precarry bits generated by the CSA.

To understand how the carryout is determined by the lookahead circuitry, it is advisable first to consider a few simple examples. Consider, for example, the first four bit positions numbered 0 through 3 of the CSA and assume that the presum and precarry bits presently stored in these positions have the following values:

| CSA bit positions | 0 1 2 3 |
|---|---|
| Presum (PS) bits | 1 0 0 0 |
| Precarry (PC) bits | 0 1 0 0 |

If the PS and PC bits were to be combined in the above example, the addition of the $PC_1$ bit value 1 to the $PS_0$ bit value 1 would produce a carry of 1 at position 0. Now, if instead of actually adding these PS and PC bits together, one were to determine the logical "AND" function of $PS_0$ and $PC_1$, the logical output of this AND function would be a "lookahead" value of 1 representing the carry bit that would be produced at CSA bit position 0 if the $PC_1$ bit actually had been added to the $PS_0$ bit. The symbol "$K_N$" will herein represent the carry lookahead value from bit position N. $K_0$ is the lookahead from bit position 0, which in this example has been determined to have a value of 1 as explained above. To determine the value of the ultimate carryout bit, it is necessary to obtain the "exclusive-OR" function of the lookahead from position 0, i.e., $K_0$, and the precarry bit at position 0, i.e., $PC_0$. In this example, since $PC_0 = 0$ and $K_0 = 1$, the "carryout lookahead" (COLA) is 1.

Sometimes the respective patterns of the presum and precarry bit strings may be such that the lookahead $K_0$ from bit position 0 is zero; yet there still could be a carryout lookahead of 1 due to the logical propagation of a carry from a lower order. Consider the following example in which there has been a carry from lower orders into bit position 3:

| CSA bit positions | 0 1 2 3 |
|---|---|
| Presum (PS) bits | 1 1 1 0 |
| Precarry (PC) bits | 0 0 0 1 |

Here the values of the PS and PC bits as shown above are not such as to produce a lookahead of 1 from either the bit position 0 or 1 if one were to consider only the PS and PC bit patterns in the first three positions 0 to 2. However, a precarry bit value of 1 in the fourth position ($PC_3$), when it is AND'ed with the presum value in the third position ($PS_2$), will produce a lookahead value $K_2$ of 1 from the CSA bit position 2. When this lookahead $K_2$ is AND'ed with the presum value $PS_1$ of 1 at bit position 1, the lookahead is thereby logically "propagated" from position 2 to position 1. Again, when this propagated lookahead of 1 is AND'ed with the presum value $PS_0$ of 1 at the 0 bit position, it is thereby further propagated to provide a lookahead $K_0$ having a value of 1 at the 0 position. When this value is exclusively-OR'ed with the $PC_0$ bit of 0, a carryout lookahead (COLA) of 1 is produced.

Thus, to recapitulate, a carryout lookahead bit of 1 may be produced as a direct carry lookahead resulting from the logical AND of $PS_0$ and $PC_1$ bits each having a 1 value, or it also could result by propagation of such a lookahead from a lower adder to the 0'th bit position, if the patterns of presum and precarry bits in the higher orders are conducive to such propagation. In general, the lookahead from any bit position N can be represented logically by the recursive equation in the upper part of FIG. 7. The lookahead $K_M$ from the highest-numbered (i.e., lowest-ordered) bit position is zero. The respective lookahead values $K_N$ for the higher orders then are determined progressively for decreasing values of N, until eventually the lookahead $K_0$ from position 0 is determined. The carryout lookahead value (COLA) then is determined as the exclusive-OR of $PC_0$ and $K_0$, as indicated in the lower part of FIG. 7.

In practice, as explained hereinafter, the value of COLA may be determined under two different conditions, according to the form of the addition step (FIG. 5) which immediately precedes the lookahead function. If the F register is degated from the CSA during this addition, the divisor will not be involved in the addition process, and under these circumstances the value of COLA determined from the resulting PS and PC bit patterns will be herein designated "COLA2", to denote that it was derived from the addition of only two terms, namely, the latched sum (S) and carry (C) values, without a third input from the F register. Under the other condition, where the F register is gated to the CSA, the divisor is included as a third term in the addition process, and the carryout lookahead value derived from the resulting presum (PS) and precarry (PC) values under these circumstances will be designated "COLA3". In either case, however, the value of COLA may be expressed mathematically as shown in FIG. 7.

Referring again to the recursive function for determining the lookahead $K_N$ shown in the upper part of FIG. 7, it will be helpful to note that the parenthetical expression "($PS_N \cdot PC_{N+1}$)" represents the direct lookahead from bit position N, i.e., the logical AND of $PS_N$ and $PC_{N+1}$. The parenthetical expression "($PS_N + PC_{N+1}$)" represents the "propagation" of a lookahead from the next lower-order position N+1 through position N, which will occur if either $PS_N$ or $PC_{N+1}$ has a bit value of 1. (The symbol "+" between terms signifies a logical OR function.) Thus, there will be a direct lookahead of 1 from position N if both $PS_N$ and $PC_{N+1}$ are 1 bits, and there will be a propagated lookahead of 1 from position N if either $PS_N$ or $PC_{N+1}$ is a 1 bit and the lookahead $K_{N+1}$ from position N+1 has a 1 value.

The logical relationships just described are embodied in the circuitry of FIG. 8, which shows apparatus for determining the lookahead from a group of four consecutive CSA bit positions respectively numbered "i" through "i+3". The direct lookahead from the i'th position is provided by AND gate 70, which produces a 1 bit if both $PS_i$ and $PC_{i+1}$ have 1 values. The "propagate" functions are performed by the OR gates 71, 72 and 73 in conjunction with the AND gates 74, 75 and 76. For example, if either one of the $PS_i$ and $PC_{i+1}$ bits has a 1 value, and there is a lookahead of 1 from position $i+1$ due to the fact that both of the $PS_{i+1}$ and $PC_{i+2}$ bits have 1 values, then the OR gate 71 and AND gate 74 together will produce a propagated lookahead of 1. In similar fashion, the circuitry of FIG. 8 will test for lookahead and propagate conditions throughout the remainder of the bit positions. If the CSA has more than three remaining bit positions following position $i$, then the last AND gate 76 will receive a precarry bit input $PC_{i+4}$ from the next higher-numbered bit position $i+4$. If there is no higher-numbered position, then the AND gate 76 may be omitted. In the event that a lookahead bit of 1 is generated directly at position $i$, or is generated at one of the lower bit positions from which it can be propagated to position $i$ through appropriate intervening PS and PC bit patterns, a 1 bit will be produced at the outputs of one or more of the AND gates 70, 74, 75 and 76, and such bit will be passed by an OR gate 77 to produce a "group lookahead" bit of 1. If the patterns of the PS and PC bits are not such that any of these conditions can be fulfilled, then the group lookahead bit is zero.

Merely because a chosen group of CSA bit positions is storing PS and PC bit patterns that will not of themselves yield a 1 bit as the group carry lookahead, this does not necessarily mean that the group as a whole will block the transmission of a "1" lookahead bit from a lower-ordered group of CSA bit positions. The PS and PC bit patterns within the group under consideration may be such that a lookahead from a lower-ordered group will propagate completely through the group in question. The "group propagate" circuitry in FIG. 9 is designed to test the PS and PC bit patterns within a group of CSA positions $i$ through $i+3$ to ascertain the lookahead propagation capability thereof. If there is any bit pair in this group comprising a PS bit of given rank and a PC bit of next lower rank which includes at least one bit of value 1, then one or more of the OR gates 80 to 83, FIG. 9, will pass a 1 bit to the AND gate 84. If all of the OR gates pass 1 bits to gate 84, then a "group propagate" bit of value 1 is produced; otherwise a 0 bit will result. When a group generates a group propagate bit of 1, it then is able to propagate a carry lookahead, if any, from the next lower-ranked group.

Thus, FIGS. 8 and 9 indicate how the illustrated logical circuitry can be employed to "look ahead" for determining whether or not any group of four consecutive CSA bit positions contains presum (PS) and precarry (PC) bit patterns of such character that if these PS and PC bits actually were added together, they would produce a carryout from the highest-order position in the group, or whether they would propagate a carry, if any, from the next lower order outside the group. The illustrated circuitry is shown at a logic level which may be higher than that of the actual implementation. The details of the constituent NAND or NOR circuitry that may be used in practice to implement the illustrated AND and OR functions are not shown, such implementation being well within the average skill of the art.

Figure 10:
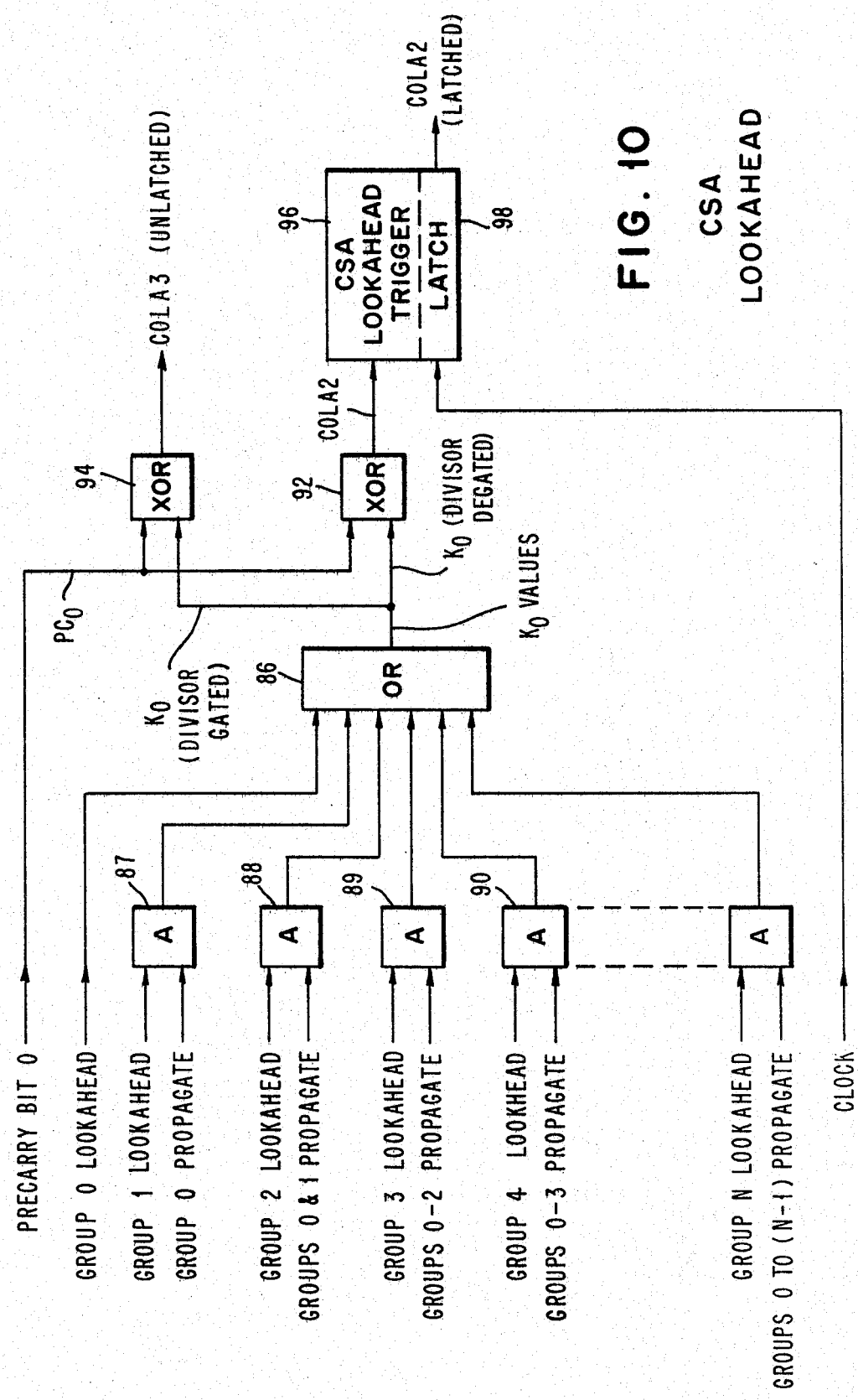

Continuing with the description of the lookahead logic network 32, FIG. 1, reference now is made to FIG. 10, which shows how the outputs of the various group lookahead and group propagate circuits are combined to ascertain the ultimate lookahead, $K_0$, from position 0, which is utilized at different times to determine the carryout lookahead values COLA2 and COLA3 mentioned above. If group 0 (comprising CSA bit positions 0–3) has generated a group lookahead of 1, this bit will pass through an OR gate 86 to produce a CSA lookahead ($K_0$) of 1. If there is a group lookahead of 1 from group 1 and a group propagate of 1 from group 0, the AND gate 87 will pass a 1 to OR gate 86, producing a $K_0$ value of 1. In similar fashion, each of the AND gates 88, 89, 90 and so on will produce an output that logically combines the lookahead from its respective group with the propagate from all lower-numbered (i.e., higher-ordered) groups of CSA positions. Where an extended group propagate value of 1 is AND'ed with a group lookahead of 1 in this fashion, the result is a CSA lookahead value $K_0$ of 1. If the conditions are other than those described above, the value of $K_0$ is zero.

The CSA lookahead $K_0$ now must be exclusively-OR'ed with the highest-order precarry bit $PC_0$ in order to produce the carryout lookahead, COLA, which equals the value of the carryout that would be produced if the various precarry bits actually were added to the associated presum bits instead of being registered as separate CSA outputs. As indicated above, the lookahead process is performed twice in each cycle of the division process—once with the divisor degated from the CSA and again with the divisor gated to the CSA. In the first instance the carryout lookahead that is generated by this logical process is designated "COLA2", and in the second instance it is called "COLA3". The reason for this procedure will be explained hereinafter.

In FIG. 10 the two situations just described are symbolically represented by the exclusive-OR gate 92, which produces the COLA2 bit, and the exclusive-OR gate 94, which produces the COLA3 bit. It will be recognized, of course, that both gates 92 and 94 may simultaneously produce the same COLA output value at any given time. However, COLA2 is generated by gate 92 at a time when the divisor is degated, and it is then stored in the CSA lookahead trigger 96, which is an edge-triggered flip-flop of standard design. The latch portion 98 of trigger 96 is clocked at the appropriate time to hold the COLA2 bit as a latched value for future use. At this time the output of gate 94 is ignored. Subsequently, at a time when the divisor is gated to the CSA, the exclusive-OR gate produces a COLA3 bit whose value depends upon the PS and PC values then registered in the CSA. COLA3 is an unlatched value which is utilized immediately in the manner presently explained. At this same time, the gate 92 is furnishing the COLA3 value to trigger 96, but since this does not occur in coincidence with a clock pulse at the trigger input, the latch 98 does not receive the COLA3 value, which thereby is effectively ignored by the edge trigger 96.

Variations can be made in the logical circuitry of FIG. 10 (and also in that of FIG. 11, which will next be described) without departing from the spirit of the invention. Again it is emphasized that these diagrams are higher-level representations of logical circuitry that for practical reasons may be actually implemented in NAND or NOR configurations arranged to provide the same higher-level functions.

Figure 11:
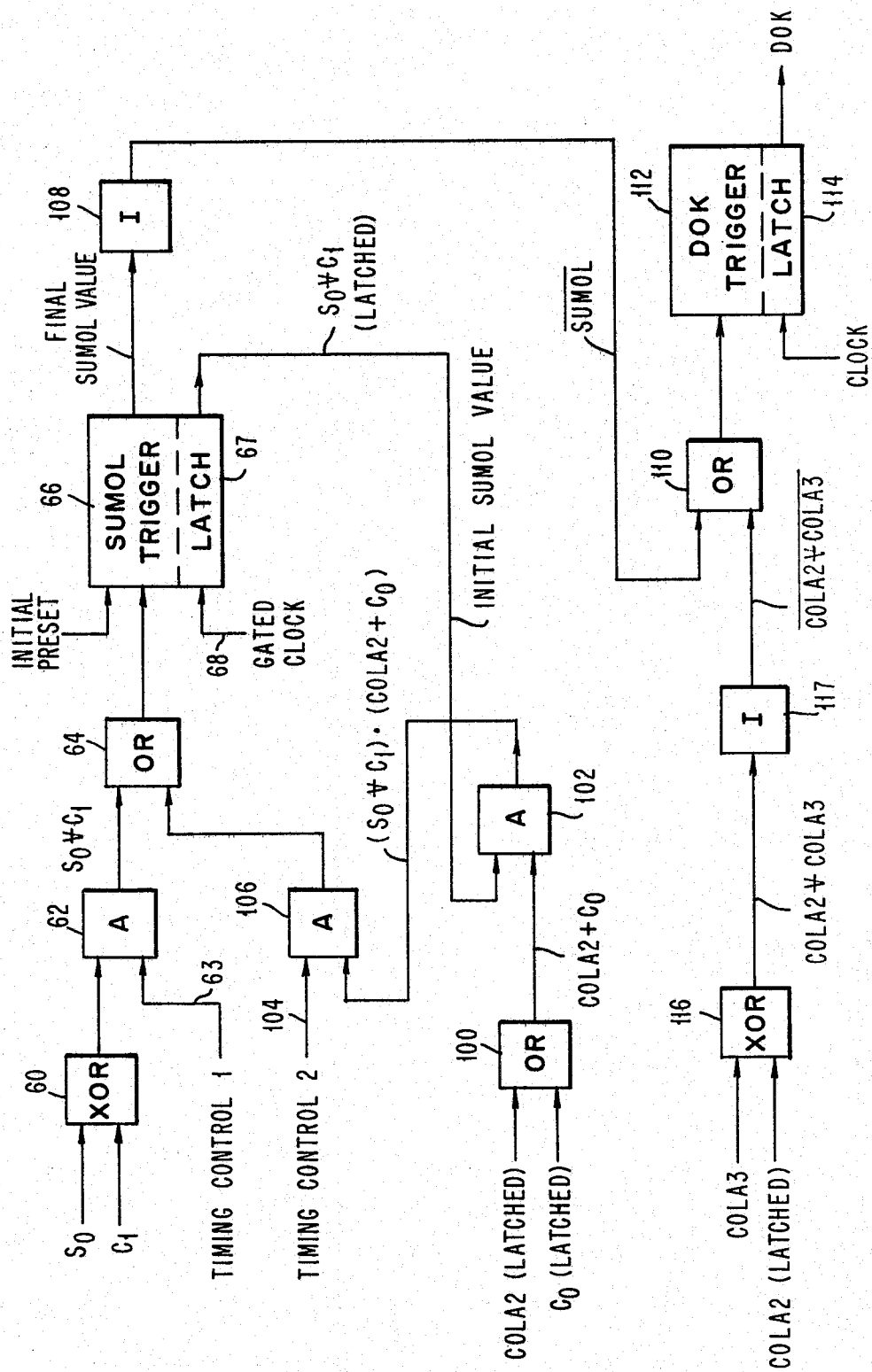

FIG. 11, which was partially described hereinabove, represents the final stage of the lookahead logic network 32 (FIG. 1), wherein it is determined whether or not each proposed complemental subtraction of the division process would or would not be successful if actually performed. As already explained, certain values generated by previous actions of this logic network are presently being held in a latched state. The exclusive-OR of the $S_0$ and $C_1$ bits (as they existed prior to left shift) is being provided by the SUMOL latch 67, FIG. 11. The exclusive-OR of the $K_0$ and $PC_0$ bits, as they stood after the left shift but before gating the divisor to the CSA, is being provided by the CSA lookahead latch 98, FIG. 10, in the form of the COLA2 bit (carryout lookahead prior to gating the divisor).

Referring again to FIG. 11, it is desirable at this point in the cycle to determine the value that the leftmost bit in the sum would have had if the sum (S) and carry (C) bits had been combined prior to the left shift of the CSA contents, this being the SUMOL (sum bit out left) value. One constituent of this SUMOL value already has been determined, namely, the value of $S_0 \forall C_1$ prior to left shift ("$\forall$" symbolizing the exclusive-OR function). Another constituent is COLA2, the projected carryout that would result from addition of the PS and PC bits following the left shift operation. This value, too, was previously determined. Both of these constituent values are latched. Still another constituent of the SUMOL value is $C_0$, the latched value of the carry bit currently registered in the 0 position of the CSA carry latches 28, FIG. 1. If either COLA2 or $C_0$ has a 1 value, this would be carried into the order to the left of the 0 bit position of the CSA in an actual addition; therefore this output would have to be AND'ed with the initial $S_0 \forall C_1$ value previously determined in order to ascertain what sum bit would have been shifted out of the CSA during the the left shift operation if all sum and carry bits had been combined prior to the shift. This is one of two critical values which determine whether a proposed subtraction will be successful. The OR gate 100 and the AND gate 102, FIG. 11, together perform the function of logically determining the final SUMOL value, as follows:

Final SUMOL = $(S_0 \forall C_1) \cdot (COLA2 + C_0)$

Under control of a timing pulse on control line 104, FIG. 11, this final SUMOL value is passed at the appropriate time by AND gate 106 through OR gate 64 to the SUMOL trigger 66, from which it emerges as an unlatched output SUMOL value that is inverted by the inverter 108. The complemental SUMOL value then passes through an OR circuit 110 to the DOK ("divide OK" or "divide successful") trigger 112, which is a standard type of edge-triggered flip-flop. As explained above, if the final SUMOL value is 0, this indicates that the left shift of the CSA contents which occurs as a condition precedent to each subtraction would have caused a complement 0 or true 1 bit to be shifted out of the CSA if the sum amd carry bits had been combined prior to left shift rather than being separately registered in the adder. Where a bit having this value stands to the left of the divisor, the success of the proposed substraction is assured. Hence, if the final SUMOL bit is 0, this will be inverted to a true 1 by inverter 108, and the 1 bit then will pass through the OR gate 110 to set the DOK trigger for indicating a successful trial subtraction. At the appropriate time the DOK trigger 112 is clocked, setting its latch 114 to a 1 state for providing a latched DOK signal of that same value. A DOK bit of 1 will condition the adder to perform an actual subtraction.

Where the SUMOL bit is not of such value as to assure the success of the proposed subtraction (that is, where SUMOL = 1), there still can be a successful subtraction if the complemental subtraction of the divisor from the left-shifted minuend would not produce a carryout bit of 1. One cannot immediately deduce whether a carryout would result from adding the divisor to the minuend represented by the presum (PS) and precarry (PC) bits, however, because first it must be known what effect the addition of the PS and PC bits alone (without the divisor) would have insofar as generating a carryout is concerned. This effect is indicated by the lookahead value COLA2, which was determined in the manner explained above. This carryout lookahead without the divisor (COLA2) then is compared with the carryout lookahead COLA3 that is obtained when the divisor is gated to the CSA. If COLA2 and COLA3 are of equal value, this means that the carryout obtained when the divisor is gated to the CSA is no different that the carryout that was obtained merely by adding the sum and carry bits together before the divisor was gated to the CSA; hence, subtraction of the divisor from the current minuend will produce no carryout, hence no overdraft. Conversely, inequality of COLA2 and COLA3 indicates that there would be an overdraft if the subtraction actually were performed.

As shown in FIG. 11 and COLA2 and COLA3 values furnished by the logic circuitry of FIG. 10 are compared by the exclusive-OR gate 116. The value representing this comparison (0 for equality; 1 for inequality) is inverted by the inverter 117, and the complemental output (1 for equality of COLA2 and COLA3; 0 for inequality) is passed through the OR gate to the DOK trigger 112. If this trigger 112 has not already been set to its 1 state, an output of 1 from the inverter 117 will, at the appropriate time, cause the DOK latch 114 to be set to its 1 state for registering a "divide successful" condition. If the trigger 112 receives a 1 input from either the inverter 108 or 117, the DOK "1" output will signal the system to go ahead with the proposed complemental subtraction. If the DOK output is zero at clock time, then no actual subtraction is performed in the current cycle, and the next cycle immediately commences, starting a new series of determinations involving a left shift of the minuend or remainder (unless the allocated number of left shifts already has taken place, in which case the dividing operation terminates).

The triggers 66, 96 and 112, FIGS. 10 and 11, have been described as D type edge-triggered flip-flops of standard design. Where circuit design economy can be achieved, however, the trigger circuitry may be modified to perform combined trigger and gate functions. Subsequently there will be disclosed herein some examples of the way in which circuitry of this kind has been consolidated to achieve a more economical design in the case of the carry save adder (FIG. 12).

At this point, attention will be given to some operational examples which involve the various functions of the illustrated apparatus that have been described above. The first of these examples is presented below (EXAMPLE ONE). This involves the division of a decimal dividend 131 by a decimal divisor 9, which gives a decimal quotient of 14 with a remainder of 5. In hexadecimal notation (base 16), the dividend would be represented as 83 and the divisor as 9. Since the leftmost hexadecimal digit "8" is smaller than the leftmost or only divisor digit 9, it will not be necessary to perform a preliminary right alignment (right shift through one hexadecimal position) of the dividend. There is a fundamental requirement that the true value of the leftmost hexadecimal digit of the dividend must not equal or exceed the leftmost hexadecimal digit of the divisor at the start of the division process. If this condition is not met initially, then the dividend must be right-shifted one hexadecimal position (four bits), thereby effectively inserting a true zero value at the left end of the dividend. An example of this kind will be considered hereinafter.

Returning now to a consideration of EXAMPLE ONE below, it is assumed herein, for purpose of illustration only, that the carry save adder CSA 20, FIG. 1, is incorporated in a floating point processor which registers the operand values in accordance with "excess 40" hexadecimal notation. Thus, for instance, the hexadecimal dividend "83" is a positive two-order number; hence, its hexadecimal characteristic is 40 plus 2, i.e., 42, wherein 2 is the positive exponent. The divisor 9 has a positive exponent of 1; hence its floating point characteristic is 41. The dividend is entered first, passing successively through the shift register 22 and F register 24, FIG. 1, to the CSA 20, where it enters the data input terminals in inverted (ones-complement) binary form. Thus, in the present case, the true binary value of the dividend (first twelve orders only) is 1 0 0 0 0 0 1 1 0 0 0 0, and its inverted complemental equivalent is 0 1 1 1 1 1 0 0 1 1 1 1. This dividend complement is stored in the sum latches 26 of the CSA 20. The carry latches 28 initially are in their reset zero states. The binary divisor 1 0 0 1 0 0 0 0 0 0 0 0 is entered into the F register 24, where it is stored in true form throughout the dividing operation.

The actions performed by the processor in solving the problem identified as EXAMPLE ONE are represented below in tabular form. Following this table, a description of the operation is presented. For convenience, various lines of the tabular presentation are given consecutive reference numbers, at least some of which are repeated for each succeeding cycle of the subtraction process. In this presentation, only the first twelve orders (0 through 11) of the numerical values will be considered. When the processor is operating in double precision mode, the full range of 56 bit positions is utilized. For present purposes it will not be necessary to consider all of these orders or positions. It should be mentioned also that the dividing procedure which is followed herein is not limited to use in a floating point processor but could be utilized as well in fixed point arithmetic operations. The processing of the floating point characteristics will not be described herein inasmuch as such operations are not essential to an understanding of the invention. The subscripts applied to various bit designations refer to the respective bit position numbers. For example, $S_0$ denotes the sum bit in position 0; $C_1$ denotes the carry bit in position 1, and so on.

EXAMPLE ONE

| DECIMAL | HEXADECIMAL | BINARY |
|---|---|---|
| 131 ÷ 9 | 83 ÷ 9 | 10000011 ÷ 1001 |

ENTER FIRST OPERAND (DIVIDEND)
   HEX. 4 2 8 3 0 0 0 0
ENTER SECOND OPERAND (DIVISOR)
   HEX. 4 1 9 0 0 0 0 0

INITIAL CSA SUM LATCH (S) AND CARRY LATCH (C) VALUES:
INVERTED DIVIDEND S   0 1 1 1 1 1 0 0 1 1 1 1 (REMAINING BITS NOT SHOWN)
INITIAL CARRIES C       0 0 0 0 0 0 0 0 0 0 0 0

| LINE NO. | | |
|---|---|---|
| | BIT POSITION NUMBERS 0 1 2 3 4 5 6 7 8, ETC. | |
| 1 | $S_0 \forall C_1 = 0$ (INITIAL SUMOL VALUE) | |
| 2 | SHIFT SUM L1 CARRY L2 (FIRST LEFT SHIFT) | |
| | INPUTS TO CSA FOR PERFORMING SHIFT: | |
| 3 | DIVISOR (DEGATED) | 0 0 0 0 0 0 0 0 0 0 0 0 |
| 4 | SUM INPUT | 1 1 1 1 1 0 0 1 1 1 1 1 |
| 5 | CARRY INPUT | 0 0 0 0 0 0 0 0 0 0 0 0 |
| | OUTPUTS OF CSA AFTER SHIFT: | |
| 6 | SUM LATCHES S | 1 1 1 1 1 0 0 1 1 1 1 1 |
| 7 | CARRY LATCHES C | 0 0 0 0 0 0 0 0 0 0 0 0 |
| 8 | LOOKAHEAD FOLLOWING SHIFT | |
| | VALUES RESULTING FROM NONPERFORMING ADDITION OF S & C: | |
| 9 | PRESUMS PS | 1 1 1 1 1 0 0 1 1 1 1 1 |
| 10 | PRECARRIES PC | 0 0 0 0 0 0 0 0 0 0 0 0 |
| | DETERMINE COLA WITH DIVISOR DEGATED (COLA2) | |
| 11 | COLA2 = 0. ENTER RESULT INTO CSA LOOKAHEAD LATCH | |
| 12 | SUMOL DETERMINED: SUMOL = INITIAL SUMOL $\forall$ (COLA2 + $C_0$) = 0 | |
| 13 | DO TRIAL SUBTRACTION WITH DIVISOR GATED TO CSA | |
| | INPUTS TO CSA FOR DETERMINING 3-INPUT COLA (COLA3): | |
| 14 | DIVISOR (GATED) | 1 0 0 1 0 0 0 0 0 0 0 0 |
| 15 | SUM INPUT | 1 1 1 1 1 0 0 1 1 1 1 1 |
| 16 | CARRY INPUT | 0 0 0 0 0 0 0 0 0 0 0 0 |
| | VALUES RESULTING FROM NONPERFORMING ADDITION OF S, C & DIVISOR: | |
| 17 | PRESUMS PS | 0 1 1 0 1 0 0 1 1 1 1 1 |
| 18 | PRECARRIES PC | 1 0 0 1 0 0 0 0 0 0 0 0 |
| | DETERMINE COLA WITH DIVISOR GATED (COLA3) | |
| 19 | COLA3 = 1 | |
| | DETERMINE WHETHER DIVIDE IS SUCCESSFUL | |
| | DOK = SUMOL + COLA2 $\forall$ COLA3 | |
| 20 | DOK = 1 (DIVIDE SUCCESSFUL) | |
| 21 | PERFORM ONES-COMPLEMENT SUBTRACTION (1ST HALF CYCLE) | |
| | INPUTS TO CSA FOR 1ST HALF CYCLE: | |
| 22 | DIVISOR (GATED) | 1 0 0 1 0 0 0 0 0 0 0 0 |
| 23 | SUM INPUT | 1 1 1 1 1 0 0 1 1 1 1 1 |
| 24 | CARRY INPUT | 0 0 0 0 0 0 0 0 0 0 0 0 |

EXAMPLE ONE-continued

| | | DECIMAL<br>131 ÷ 9 | HEXADECIMAL<br>83 ÷ 9 | BINARY<br>10000011 ÷ 1001 |
|---|---|---|---|---|
| | | OUTPUTS OF CSA AFTER ADDITION OF 1ST HALF CYCLE INPUTS: | | |
| 25 | | SUM LATCHES S | 011010011111 | |
| 26 | | CARRY LATCHES C | 100100000000 | |
| 27 | | PERFORM ADDITION TO PROPAGATE CARRIES (2ND HALF CYCLE) | | |
| | | INPUTS TO CSA FOR 2ND HALF CYCLE: | | |
| 28 | | DIVISOR (DEGATED) | 000000000000 | |
| 29 | | SUM INPUT | 011010011111 | |
| 30 | | CARRY INPUT | 001000000000 | |
| | | OUTPUTS OF CSA AFTER ADDITION OF 2ND HALF CYCLE INPUTS: | | |
| 31 | | SUM LATCHES S | 010010011111 | |
| 32 | | CARRY LATCHES C | 001000000000 | |
| 33 | | GENERATE QUOTIENT BIT. Q = 1 | | |
| 34 | | INCREMENT SHIFT COUNT. SHIFT = 1 | | |
| | | FIRST CYCLE COMPLETED | | |

```
        START SECOND CYCLE

1       INITIAL SUMOL = 0
2       SHIFT SUM L1 CARRY L2 (SECOND LEFT SHIFT)
3           INPUTS TO CSA:      000000000000
4                               100100111111
5                               100000000000
6           OUTPUTS OF CSA: S   000100111111
7                           C   100000000000
8       LOOKAHEAD FOLLOWING SHIFT
9                           PS  000100111111
10                          PC  000000000000
11          COLA2 = 0
12          SUMOL = INITIAL SUMOL ¥ (COLA2 + C₀) = 1
13      DO TRIAL SUBTRACTION WITH DIVISOR GATED TO CSA
14          INPUTS TO CSA:      100100000000
15                              000100111111
16                              000000000000
17          OUTPUTS OF CSA:PS   100001111111
18                          PC  001000000000
19          COLA3 = 0
20          DOK = 1 (DIVIDE SUCCESSFUL)
21      PERFORM ONES-COMPLEMENT SUBTRACTION
22          INPUTS TO CSA:      100100000000
23                              000100111111
24                              000000000000
25          OUTPUTS OF CSA: S   100001111111
26                          C   001000000000
27      PERFORM ADDITION TO PROPAGATE CARRIES
28          INPUTS TO CSA:      000000000000
29                              100001111111
30                              001000000000
31          OUTPUTS OF CSA: S   101000111111
32                          C   000000000000
33      Q = 1 1
34      SHIFT = 2

SECOND CYCLE COMPLETED
```

```
        START THIRD CYCLE

1       INITIAL SUMOL = 1
2       SHIFT SUM L1 CARRY L2 (THIRD LEFT SHIFT)
3-5 NOT SHOWN
6                           S   010001111111
7                           C   000000000000
8       LOOKAHEAD FOLLOWING SHIFT
9                           PS  010001111111
10                          PC  000000000000
11          COLA2 = 0
12          SUMOL = 1 ¥ (0 ¥ 0) = 1
```

```
13         DO TRIAL SUBTRACTION
14-16 NOT SHOWN
17                    PS   1 1 0 1 0 1 1 1 1 1 1 1
18                    PC   0 0 0 0 0 0 0 0 0 0 0 0
19         COLA3 = 0
20         DOK = 1 (DIVIDE SUCCESSFUL)
21         PERFORM ONES-COMPLEMENT SUBTRACTION
22-24 NOT SHOWN
25                    S    1 1 0 1 0 1 1 1 1 1 1 1
26                    C    0 0 0 0 0 0 0 0 0 0 0 0
27         PERFORM ADDITION TO PROPAGATE CARRIES
28-30 NOT SHOWN
31                    S    1 1 0 1 0 1 1 1 1 1 1 1
32                    C    0 0 0 0 0 0 0 0 0 0 0 0
33         Q = 1 1 1
34         SHIFT = 3

THIRD CYCLE COMPLETED

START FOURTH CYCLE

1          INITIAL SUMOL = 1
2          SHIFT SUM L1 CARRY L2 (FOURTH LEFT SHIFT)
3-5 NOT SHOWN
6                     S    1 0 1 0 1 1 1 1 1 1 1 1
7                     C    0 0 0 0 0 0 0 0 0 0 0 0
8          LOOKAHEAD FOLLOWING SHIFT
9                     PS   1 0 1 0 1 1 1 1 1 1 1 1
10                    PC   0 0 0 0 0 0 0 0 0 0 0 0
11         COLA2 = 0
12         SUMOL = 1 ¥ (0 ¥ 0) = 1
13         DO TRIAL SUBTRACTION
14-16 NOT SHOWN
17                    PS   0 0 1 1 1 1 1 1 1 1 1 1
18                    PC   1 0 0 0 0 0 0 0 0 0 0 0
19         COLA3 = 1
20         DOK = 0 (DIVIDE UNSUCCESSFUL)
21-32 OMITTED.  SKIP SUBTRACTION THIS CYCLE.  S & C NOT CHANGED.
33         Q = 1 1 1 0
34         SHIFT = 4

FOURTH CYCLE COMPLETED

REMAINING CYCLES NOT SHOWN
```

The dividing operations depicted above now will be described in detail. Initially the sum (S) latches of the CSA are set to store the bits of the inverted dividend. The carry (C) latches of the CSA initially store zeros. As explained above, the leftmost four bits of the inverted dividend (bit positions 0-3) represent the complement of the first hexadecimal digit in this operand, the true value of which is by definition smaller than the value of the first hexadecimal digit (bit positions 0—3) in the divisor, presently stored in the F register. Hence, before the first subtraction can begin, there must be a left shift of the CSA contents. Just prior to this left shift, as depicted in line No. 1 of the above table, the initial SUMOL value is determined by taking the exclusive-OR function of the $S_O$ and $C_1$ bit values. Then (line 2) the CSA executes a left shift in which the S bits are shifted one position and the C bits two positions to the left. As indicated in lines 3-5, the inputs to each CSA bit position consist of a zero divisor bit (since the advisor is degated) plus the sum bit from the next higher numbered CSA bit position and the carry bit from the second higher numbered CSA bit position (invariably a zero at this initial stage of the division procedure). As the sum bits in the S latches are shifted left to provide inputs to their neighboring CSA bit positions, an additional "1" bit is entered as a sum input to the last CSA bit position (not shown herein). This is equivalent to placing a true zero at the end of the left-shifted dividend. Since this addition of a complement 1 to the left-shifted sum is standard practice in dividing operations, no specific mention of it will be made hereinafter when describing the additional left shifts which are to take place in subsequent cycles of the division process.

The CSA outputs that become stored in the sum and carry latches as a consequence of adding the various input valves given in lines 3-5 are shown in lines 6 and 7, respectively. This addition effectively accomplishes the aforesaid left shift of the dividend. The sum and carry latches of the CSA now register, in combination, a new complemental minuend value which does not include the $S_O$ and $C_1$ bits as they stood prior to the shift, these bits having been shifted out of the CSA and replaced by new bits.

The cyclic procedure which is followed herein calls for a lookahead function to be performed immediately after a left shift of the CSA contents has occurred. This is an academic exercise insofar as the first cycle is concerned, because the lookahead value invariably will be zero when all of the carry values stored in the C latches are zeros, and thus far no carries have been generated. Nevertheless, a lookahead operation is performed at this time as a matter of routine rather than attempting to bypass this portion of the regular cyclic procedure.

The first step in a lookahead routine is to execute a "nonperforming" addition of the sum and carry values currently registered in the CSA, as described hereinabove with reference to FIG. 5. In a nonperforming addition, the latched S and C output values are used as inputs to the CSA, thereby producing presum and precarry values PS and PC which may, or may not, differ from the S and C values depending upon circumstances, and this is done without changing the latched S and C values inasmuch as the new PS and PC values are not clocked into the S and C latches of the CSA. Where no clocking of new S and C values occurs during the course of an addition, the addition is herein designated as a "nonperforming" one. In other words, the difference between a performing addition and a nonperforming addition is the absence of a clocking pulse on control line 38 (FIGS. 6 and 12) in the latter case.

In the lookahead which follows a left shift, the divisor is degated since the only concern at this time is whether addition of the C bits to the S bits would produce a carryout of 1 or 0 from the leftmost CSA bit position. The presum and precarry values resulting from this addition of S and C in the present instance are represented in lines 9 and 10 of the above table. These PS and PC values now are fed to the lookahead network for ascertaining the lookahead value $K_O$ and the CSA carryout lookahead COLA2, using the logical circuit organization symbolically represented in FIGS. 8-10. In the present instance the COLA2 value is found to be 0, as indicated in line 11 of the table, this COLA2 now is exclusively-OR'ed with the initial SUMOL value (exclusive-OR of the $S_0$ and $C_1$ bits as they stood just prior to the left shift) to obtain the final SUMOL value, representing the complemental minuend bit that would have been shifted out left it all sum and carry bits had been combined prior to left shift. In the example presently under consideration, the first operand (dividend) has a bit pattern such that in the first cycle this final SUMOL value is found to be 0 (which corresponds to a true 1 value), as indicated in line 12 of the table above.

Where the SUMOL bit is found to be 0, this indicates that a successful subtraction can be performed regardless of the divisor magnitude in the cycle under consideration, because no overdraft can occur if the minuend bit that was shifted to the left of the subtrahend has a complement 0 (true 1) value. Hence, in this case it really is immaterial what the value of the carryout bit will be when the subtraction of the divisor from the current minuend actually is performed, because regardless of its value no overdraft can occur during this subtraction, as was just stated. Nevertheless, as a matter of routine, the processor now does a trial subtraction with the divisor (F register) gated to the CSA for logically determining the carryout which will occur if and when the divisor actually is subtracted from the current minuend value in the CSA. This action is depicted in lines 13-19 of the above table.

The trial subtraction actually constitutes a second lookahead operation. As a first step in this operation, the divisor, sum and carry values respectively stored in the F register and the S latches and C latches of the CSA are entered as new CSA inputs (lines 14-16), thereby generating new sets of presum (PS) and precarry (PC) bits at the CSA output (lines 17 and 18) without disturbing the latched S and C values. These PS and PC bits are fed to the lookahead logic circuitry, FIGS. 8-10, for ascertaining the lookahead value COLA3, which in this case is found to be 1 (line 19). Next, using the circuitry of FIG. 11, the new COLA3 value is exclusive-OR'ed with the previously determined COLA2 value (line 11) to determine the true carryout which would occur by virtue of subtracting the divisor from the minuend value jointly represented by the S and C bits currently registered in the sum and carry latches of the CSA. This carryout bit (COLA2 ⊕ COLA) then is inverted, and the complement is fed to the DOK trigger 112, FIG. 11, along with the inverted SUMOL bit.

In the present instance the COLA3 value is 1 (line 19), and the exclusive-OR of this value with the COLA2 value of 0 (line 11) is 1, the true carryout. This would indicate an unsuccessful trial subtraction if it were not for the fact that the SUMOL bit shifted out of the CSA previously was found to be 0 (line 12). The inverted carryout value (complement of COLA2 ⊕ to set the DOK latch 114, FIG. 11, to its 1 state. The inverted carryout value (complement of COLA2 COLA3) is zero and therefore is not passed by the OR circuit 110 to the DOK trigger 112. This is without significance at present, however, since the DOK bit already is being set to 1 by the inverted SUMOL bit as just explained. Thus, referring to line 20, of the above table, a "divide successful" condition has been found to exist at this time, and the processor thereby is conditioned to perform a complemental subtraction of the divisor from the minuend value currently registered in the CSA. Up to this point there has been no need to perform an actual subtraction, and the sum and carry values registered in the S and C latches have remained as they were following the preceding left shift (lines 6 and 7). The intervening "nonperforming" steps of the lookahead function (lines 8-20) have been executed very rapidly, taking an almost negligible amount of time for their accomplishment. If the proposed complemental subtraction had been predicted as unsuccessful (DOK = 0), then the actual subtraction would have been skipped during this cycle, and the system would have gone immediately into the next cycle of the division process, saving the time that otherwise would have been allocated to the cycle just terminated.

Since the DOK bit is 1 in this instance, the processor now performs the complemental subtraction of the divisor from the dividend. The processor in which this invention actually has been practiced executes two addition steps to perform this subtraction. In the first half-cycle a ones-complement subtraction is performed (lines 21-26), during which the divisor bits from the F register are added to the sum and carry bits S and C in the manner shown by FIG. 4, and the resulting sum and carry bits are clocked into the S and C latches to provide outputs jointly representing the partial remainder. In the second half-cycle a further addition of these sum and carry cits is performed by the CSA, this time with the divisor degated from the CSA input (lines 27–32), the purpose of this further addition being to accomplish at least a partial consolidation of the carries with the sum bits. In those instances where a "1" carry bit is added to a "1" sum bit in the next higher order, the carry bit is thereby propagated to this next higher order, but no further propagation of carries will take place during the remainder of this cycle. The resultant sum and carry bits are clocked into the S and C latches (lines 31 and 32), where they jointly represent the current value of the partial remainder.

It is not necessary, insofar as the principle of the invention is concerned, that a carry propagate step be performed following each complemental subtraction. The carries resulting from the complemental subtraction could simply be stored (without any attempted propagation) in the C latches of the CSA, there to await processing during the next subsequent cycle (if any) of the dividing operations. If desired, after the final subtraction (or no subtraction, as the case may be) following the final left shift in the division process, the carry save adder then may be operated one or more additional times in its ADD mode to propagate the carries and consolidate them with the sum bits until all carry bits have been reduced to zero, at which time the value registered in the sum (S) latches of the CSA will be the final remainder complement. A built-in function (not specifically shown herein because of its obvious nature) will detect the condition when all carry values are zero and terminate the carry propagation. In floating point arithmetic operations the final remainder of a division usually is disregarded. In the event, however, that one desires to retain it, the partial carry propagate steps such as those depicted in lines 27–32 will use to good advantage the time that otherwise may be wasted in the second half of each machine cycle and will tend to shorten the number of carry propagate steps that must be performed in the concluding phase of the division process.

It should be noted also that the carry save adder which is disclosed herein as being applied to division problems also may be used in solving multiplication problems, wherein it will be necessary that all carries be completely propagated in the final phase of the operation to obtain the product of the multiplication. In a 56-bit carry save adder the final propagation of carries could take a great many cycles if the carries were not already partially propagated during the preceding cycles as explained above, utilizing parts of the machine cycle times that otherwise might have been wasted.

Resuming the description of EXAMPLE ONE above, the first cycle of the division process now is completed except for two concluding steps (lines 33 and 34) in this cycle. Since a subtraction was successfully performed, a first quotient bit of 1 is generated and is entered into a suitable store such as the shift register 22, FIG. 1. The shift count is incremented from 0 to 1. The upper limit of the shift count will be determined by the conditions of the problem and the usual machine parameters in accordance with known practice.

The remaining cycles which are executed by the machine in the course of performing the division specified in EXAMPLE ONE will be only briefly described herein. The general format used in describing the first cycle of operations will be followed. The initial series of line reference numbers 1–34 is repeated for each subsequent cycle, with corresponding functions in the different cycles being identified by the same line numbers. At the start of each new cycle (line 1), an initial SUMOL value ($S_0 + C_1$) is determined. Then, in line 2, a left shift of the CSA latch contents is executed, producing new S and C values (lines 6 and 7). From the new S and C bit values, the first carryout lookahead COLA2 is determined (lines 8–11). Then the sum-bit-out-left value, SUMOL, is determined (line 12), and following this the second carryout lookahead COLA3 is determined (lines 13–19). All of these determinations are accomplished by the rapid logical test procedures described above in connection with FIGS. 7–11. A DOK test then is made (line 20), and if the result is a 1 bit, the carry save adder then is operated to perform an actual ones-complement subtraction (lines 21 et seq.), and a new quotient bit of 1 is generated.

In the example presently under consideration a successful subtraction is performed in each of the first three cycles. The lookahead capability which is provided by the present invention may add a very slight increment to the time that is required to perform each of the successful subtractions. This increment is negligible, however, and may be absorbed in other design tolerances that normally are allowed anyway. In those cycles of the division process where the numerical conditions would not allow a subtraction to be actually performed without an overdraft, the lookahead capability provided by this invention is highly advantageous, enabling the processor to save the machine time that otherwise would be spent in performing a futile subtraction that results in an overdraft and then having to correct that overdraft.

A condition of the kind just described is encountered in the fourth cycle of EXAMPLE ONE (the last of the cycles tabularly represented hereinabove). In this instance both the SUMOL bit and the CSA carryout bit (COLA2 + COLA3) have 1 values, and the DOK bit accordingly is 0. Where this occurs, no complemental subtraction is performed in the present cycle, and operation proceeds to the next cycle (if any) after generating the 0 quotient bit and updating the shift count.

If the dividing operation were terminated at this point, under the conditions of the present problem, the sum (S) and carry (C) latches of the CSA jointly would register the remainder complement. If all C values are zero, or are reduced to zero by carrying propagation, then the S values represent the remainder complement. If for any reason the true value of the remainder is needed, this can be obtained by pulsing a "complement sum" control line 56 to the CSA (FIGS. 6 and 12) while it is in its ADD mode, and as will be explained later, this will convert the numerical value stored in the S latches to its ones-complement value. There may be other applications of the carry save adder not involving division wherein a sum complementing feature of this kind would be advantageous as well.

If the operands involved in the division problem are of such magnitudes that the first hexadecimal digit of the dividend exceeds the first hexadecimal digit of the divisor, a right alignment must be performed initially before the first cycle of the division process can begin. This condition is illustrated in EXAMPLE TWO, shown below in tabular form. This is a simple example in which the dividend, hexadecimal A or decimal 10, is to be divided by 5. Comparison of these hexadecimal values will show the need for performing a right alignment. This is accomplished as a series of four right shift operations, each of which is done in the manner indicated by FIG. 2. The carry bit in the C latch of each CSA bit position is simply re-entered as a carry input to that same bit position. The sum input to each CSA bit position comes from the adjacent CSA bit position on the left, FIG. 2. The F register (divisor) is degated at this time. The resulting addition effects a right shift of the CSA contents by one bit position or column. Four such shifts are needed to accomplish a right alignment. Each time a right shift occurs, a complement 1 is entered into the sum latch of the leftmost CSA bit position.

Only the first cycle of the division process in EXAMPLE TWO is shown below. Once the right alignment has been accomplished, the operation proceeds as described above in connection with EXAMPLE ONE.

The detection of a condition requiring right alignment can be accomplished simply by initially presetting the SUMOL latch 67, FIG. 11, to its "1" state at the beginning of the divide operation (by appropriately pulsing the trigger 66), then performing a trial subtraction with the divisor gated to the CSA, feeding the resulting presum and precarry bits into the lookahead network, and finally checking the condition of the DOK latch 114. If DOK=1, this indicates that a right alignment of the dividend complement is needed before division can begin.

Exemplary right shift and left shift functions have been described above in relation to CSA inputs. There also may be instances where the CSA output bit strings may have to undergo right of left shifts for alignment purposes when they are being transferred from the CSA latches to other registers or to storage. The right and left shift facilities of the illustrated CSA will greatly expedite such alignment operations wherever they are required.

CARRY SAVE ADDER (CSA)

As previously mentioned, the disclosed divider apparatus does not necessarily require a unique form of carry save adder. Other carry save adders may be adapted to serve the purposes of the present invention, so long as the following features are available:

1. The adder must be able to furnish unlatched sum and carry outputs (such as the presum and precarry bits PS and PC) as well as latched (i.e., clocked) sum and carry outputs (S and C bits).
2. The adder must contain or be associated with appropriate right and left shift circuitry.
3. The adder must have some provision for enabling its output sum bits and/or carry bits to be reentered at the input side of the adder as may be needed during the various operations of the divider.

All of the above features can be provided by conventional CSA's arranged or modified to handle these various functions. In ordinary practice, for example, the

EXAMPLE TWO

| DECIMAL | HEXADECIMAL | BINARY |
|---|---|---|
| 10 ÷ 5 | A ÷ 5 | 1 0 1 0 ÷ 0 1 0 1 |

ENTER FIRST OPERAND
   HEX. 41A00000
ENTER OPERATOR ÷
ENTER SECOND OPERAND
   HEX. 41500000
INITIAL SUM LATCH (S) AND CARRY LATCH (C) VALUES:
INVERTED DIVIDEND S      0 1 0 1 1 1 1 1 1 1 1 1 (REMAINING BITS NOT SHOWN)
INITIAL CARRIES C        0 0 0 0 0 0 0 0 0 0 0 0

DIVIDEND ALIGNED RIGHT   1 HEXADECIMAL CHARACTER
                       S 1 1 1 1 0 1 0 1 1 1 1 1 (REMAINING BITS NOT SHOWN)
                       C 0 0 0 0 0 0 0 0 0 0 0 0

$S_0$ V $C_1$ = 1 (INITIAL SUMOL VALUE)
SHIFT SUM L1 CARRY L2 (FIRST LEFT SHIFT)
INPUTS TO CSA:
DIVISOR (DEGATED)        0 0 0 0 0 0 0 0 0 0 0 0
SUM INPUT                1 1 1 0 1 0 1 1 1 1 1 1
CARRY INPUT              0 0 0 0 0 0 0 0 0 0 0 0
OUTPUTS OF CSA AFTER SHIFT:
SUM LATCHES S            1 1 1 0 1 0 1 1 1 1 1 1
CARRY LATCHES C          0 0 0 0 0 0 0 0 0 0 0 0

LOOKAHEAD FOLLOWING SHIFT
VALUES RESULTING FROM NONPERFORMING ADDITION OF S & C:
PRESUMS PS               1 1 1 0 1 0 1 1 1 1 1 1
PRECARRIES PC            0 0 0 0 0 0 0 0 0 0 0 0

DETERMINE COLA WITH DIVISOR DEGATED (COLA2)
COLA2 = O
SUMOL = INITIAL SUMOL V (COLA2 + $C_0$) = 1
DO TRIAL SUBTRACTION WITH DIVISOR GATED TO CSA
INPUTS TO CSA:
DIVISOR (GATED)          0 1 0 1 1 1 1 1 1 1 1 1
SUM INPUT                1 1 1 0 1 0 1 1 1 1 1 1
CARRY INPUT              0 0 0 0 0 0 0 0 0 0 0 0

VALUES RESULTING FROM NONPERFORMING ADDITION OF S, C & DIVISOR:
PRESUMS PS               1 0 1 1 1 0 1 1 1 1 1 1
PRECARRIES PC            0 1 0 0 0 0 0 0 0 0 0 0

DETERMINE COLA WITH DIVISOR GATED (COLA3)
COLA3 = 1
DOK = SUMOL + COLA2 V COLA3 = 0 (DIVIDE UNSUCCESSFUL)
SKIP SUBTRACTION THIS CYCLE. S & C NOT CHANGED.
GENERATE FIRST QUOTIENT BIT: Q = 0
INCREMENT SHIFT COUNT. SHIFT = 1
REMAINING CYCLES OMITTED FROM THIS SHOWING
FINAL QUOTIENT Q = 0 0 1 0 0 0 0 0 re-entrancy requirement (3) may be satisfied by using a pair of CSA's, which furnish outputs and receive inputs in alternate sequence, using separate shift circuitry to accomplish whatever column shifts are needed. All CSA's have internal circuit connections that can be tapped at appropriate places to provide the unlatched presum and precarry output bits that are needed as inputs to the lookahead logic circuitry of the present invention.

Where it is desired to achieve significant cost and space savings, however, as has been done in the case of those arithmetic processors which in practice have employed the present invention, the particular design of carry save adder circuitry herein disclosed is very advantageous. This circuit design is shown generally in FIG. 6 and is illustrated in greater detail in FIG. 12. Referring now to FIG. 12 in conjunction with the diagrammatic showing in FIGS. 1–6, it is seen that each bit position N of the CSA comprises 23 NAND gates and one NOR gate (respectively represented in the drawings by the symbols A and OR). These 24 gates handle all of the add, shift, complement and other functions that may have to be performed by each of the CSA bit positions under various circumstances. As will be pointed out specifically hereinafter, some of these gates constitute elements of edge-triggered flip-flops comprising the sum trigger 34 and the carry trigger 36, FIG. 6, and others of these gates are included in various controls and data handling circuits that serve both the sum trigger and carry trigger circuits. The sum and carry latches $26_N$ and $28_N$ of the respective CSA bit position N comprise elements that serve as output gates of the edge triggers 34 and 36 and which are set to represent sum and carry bit values that are determined solely by inputs occurring in time coincidence with the leading edges of clock pulses applied on the control line 38. The latched sum (S) and carry (C) values normally are not subject to change in the interval between successive clock pulses, regardless of changes that may occur in the inputs to the CSA during that interval. Other gates, separate from these latches, provide output presum (PS) and precarry (PC) bits that may be generated coincidentally with or independently of the clock pulses on line 38, depending upon the particular conditions which prevail at the time. A change in the unlatched PS and PC values may occur between clock pulses without affecting the latched S and C values. The PS and PC values are manifested only so long as the inputs which generated them are being applied to the CSA; hence, they are only temporarily generated values which must be utilized immediately if at all.

The CSA circuitry shown in FIG. 12 responds to various data inputs which are selected from among the types of inputs listed below according to the particular functions being performed by the CSA at the time:

| Input Line FIGS. 6 & 7 | Description of Input |
|---|---|
| 41 | A sum input from the same order |
| 160 | An inverted sum input from the same order |
| 47 or 51 | A sum input from a different order |
| 52 | A carry input from the same order |
| 42 or 48 | A carry input from a different order |
| 44 | A divisor input from the F register |
| 44 (degated) | Zero input from the F register |

Only certain ones of these inputs are utilized in the performance of any given CSA function, as explained hereinabove in connection with FIGS. 2–5. The various CSA functions will be described with particular reference to FIG. 12. Before commencing the detailed description of FIG. 12, however, a more general description of this circuitry will be given.

Figure 13:
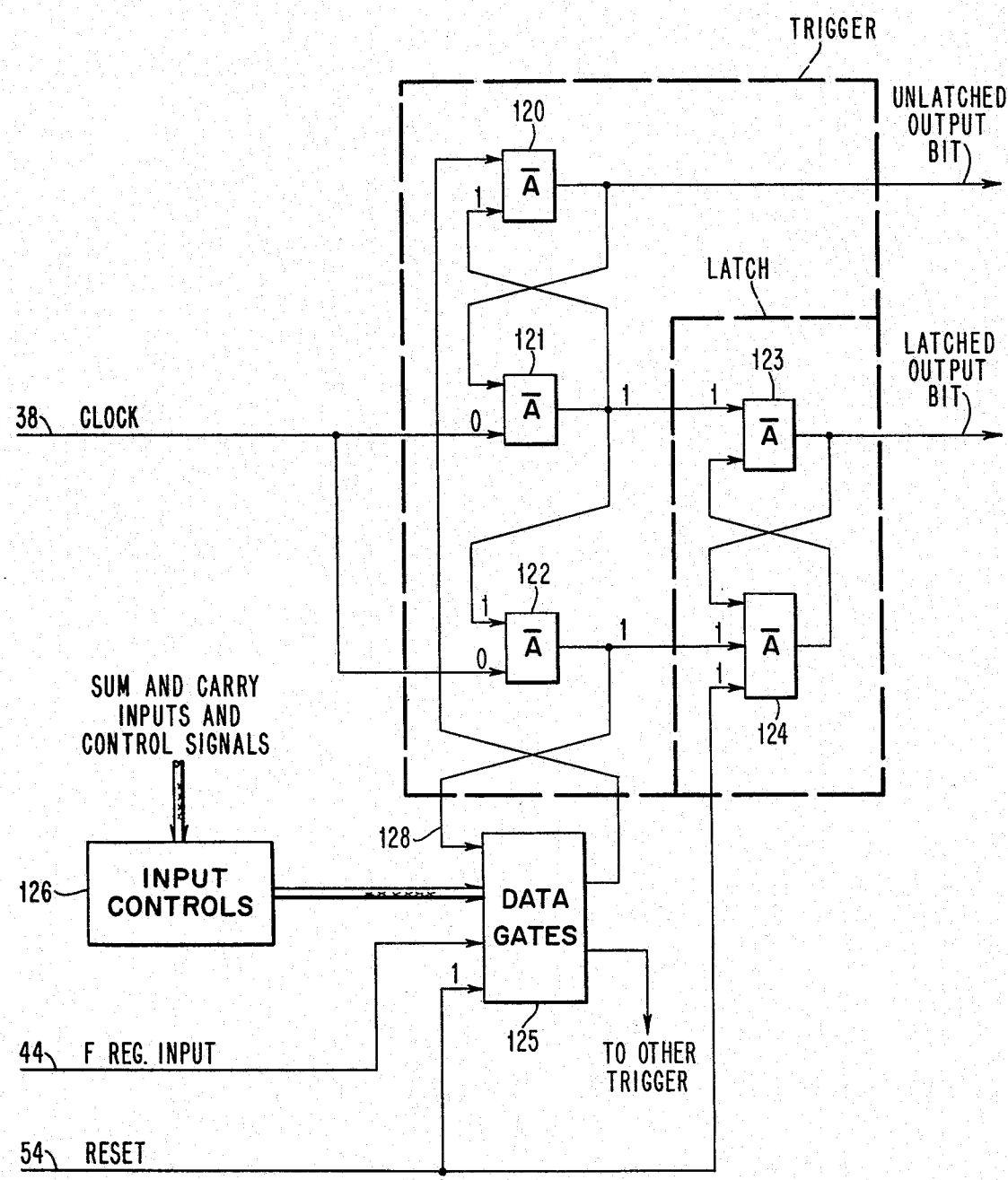
FIGS. 13–15 are simplified diagrams of the aforesaid CSA bit position showing various functions of the edge trigger circuitry employed therein.

FIG. 13 shows in simplified form the design of the trigger circuitry used herein. Each of the sum and carry triggers includes an assemblage of NAND circuits such as 120 to 124, arranged as shown. The data bit that is being entered into each trigger is supplied by a set of data gates 125, which perform certain logical processing operations upon the input data in accordance with the magnitudes of the respective input bits (sum input, carry input and divisor input, if any). The sources from which the input data bits are obtained will depend upon the type of function that the CSA is to perform, and the selection of the data sources is made by the input controls 126 in response to the control signal which is currently in effect. For instance, if the active control signal is one that calls for a right shift, then the input bits to any given CSA position N will be a sum bit $S_{N-1}$, a carry bit $C_N$ and a zero divisor (F register) bit. If the control signal calls for a left shift, the input bits then will be a sum bit $S_{N+1}$, a carry bit $C_{N+2}$, and no divisor bit. If an Add operation (Shift Carry L1 Sum L0) is requested, then the chosen inputs are sum bit $S_N$, carry bit $C_{N+1}$ and divisor bit $F_N$ or no divisor bit, according to the purpose of the addition. For a Complement Sum function, the only significant input is the complement of the sum bit $S_N$, the divisor and carry input bits being zeros in this instance.

Once the choice of input data sources has been made by the input controls 126, FIG. 13, the data gates 125 process these input bits according to their values and without regard to their origins. The gates 125 produce several output bits, one of which represents, in inverted form, the Exclusive-OR function of the input bits and another of which represents, in inverted form, the AND function of the input bits. The complement of each of these bits is to be manifested as the output of the respective sum or carry trigger, the Exclusive-OR function being manifested by the sum trigger, and the AND function being manifested by the carry trigger. The description which follows is applicable in the case of either trigger. To serve the purpose of the invention, it is further required that each trigger manifest its output in both latched and unlatched modes, the latched output being stable between clock pulses while the unlatched output is subject to change between clock pulses.

In the normal quiescent state of the trigger circuitry, FIG. 13, with no clock pulse or reset pulse being applied, the clock line 38 supplies negative or logical 0 inputs to NAND gates 121 and 122, and the reset line 54 supplies positive or logical 1 inputs to NAND gates 124 and 125, as shown in FIG. 13 (the reset line going negative only when a reset of the trigger is to be accomplished). With clock inputs of 0, the gates 121 and 122 have logical 1 outputs. Gate 121 applies its 1 output as inputs to gates 120, 122 and 123.

Figure 14:
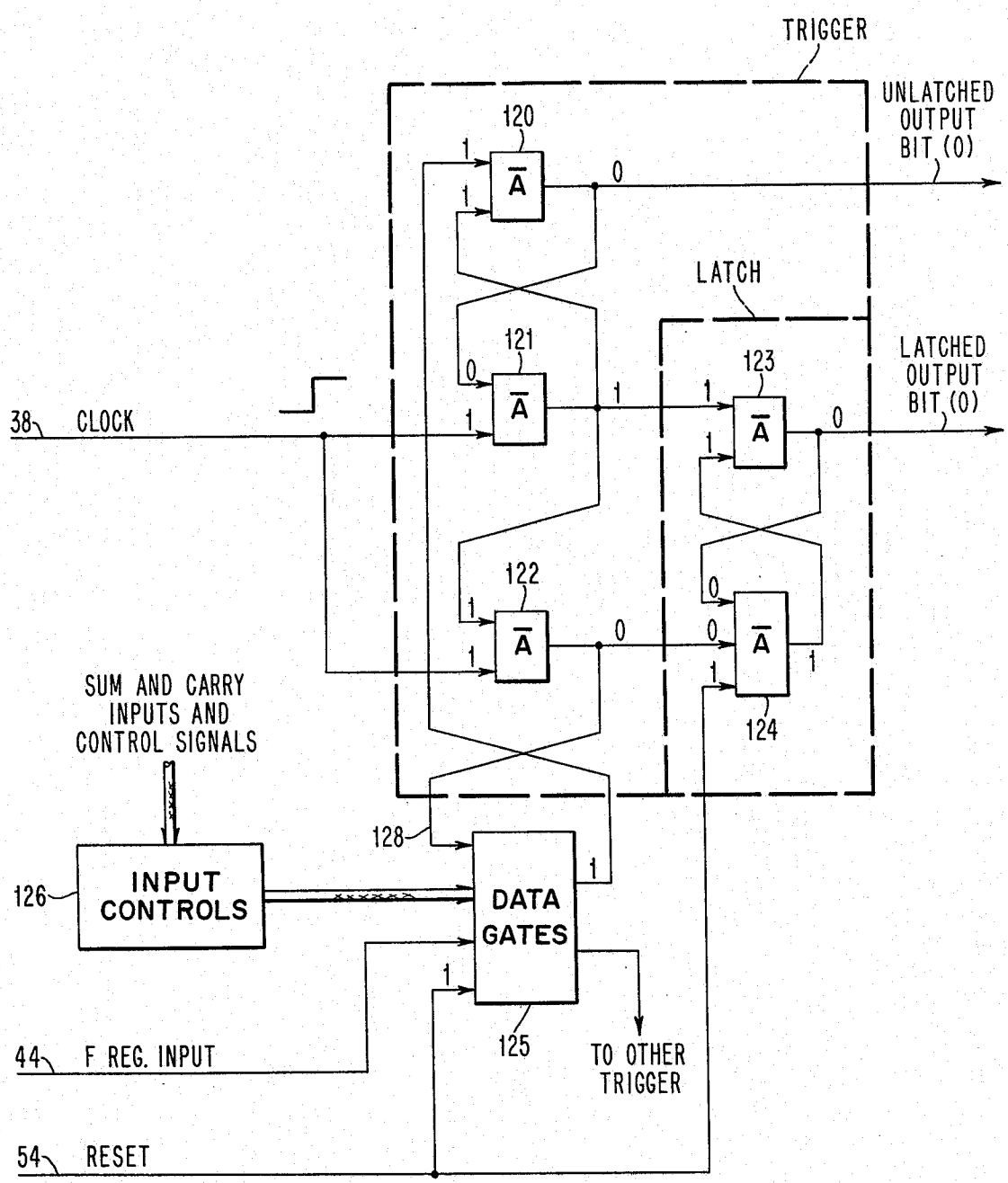

Now, if a 1 bit appears at the output of data gates 125, it is applied as input to gate 120 as shown in FIG. 14. With both of the inputs to NAND gate 120 being 1, the output of gate 120 goes to 0, thereby causing 0 to be manifested as the unlatched output bit. The 0 output of gate 120 also is applied as one of the inputs to gate 121, as in FIG. 14. When a clock pulse is applied to gates 121 and 122, the clock input goes to 1, with the result that now both of the inputs to gate 122 are 1's, as shown in FIG. 14. The output of gate 122 thereupon goes to 0, thus applying a 0 input to gate 124, which produces a 1 output that is applied as input to gate 123. Both of the inputs to gate 123 now being 1, the output of gate 123 is 0, and this is the latched output bit. Gates 123 and 124, being crosscoupled to each other, will maintain themselves in the states shown by FIG. 14 at least until the next clock pulse is applied to this trigger circuit, regardless of any changes that may occur in the value of the unlatched output bit during this interval. A connection 128 from the output of gate 122 to an appropriate point in the gate network 125 will momentarily inhibit any change in the output of gate network 125 while a 0 is being entered into the latch by gate 122.

Figure 15:
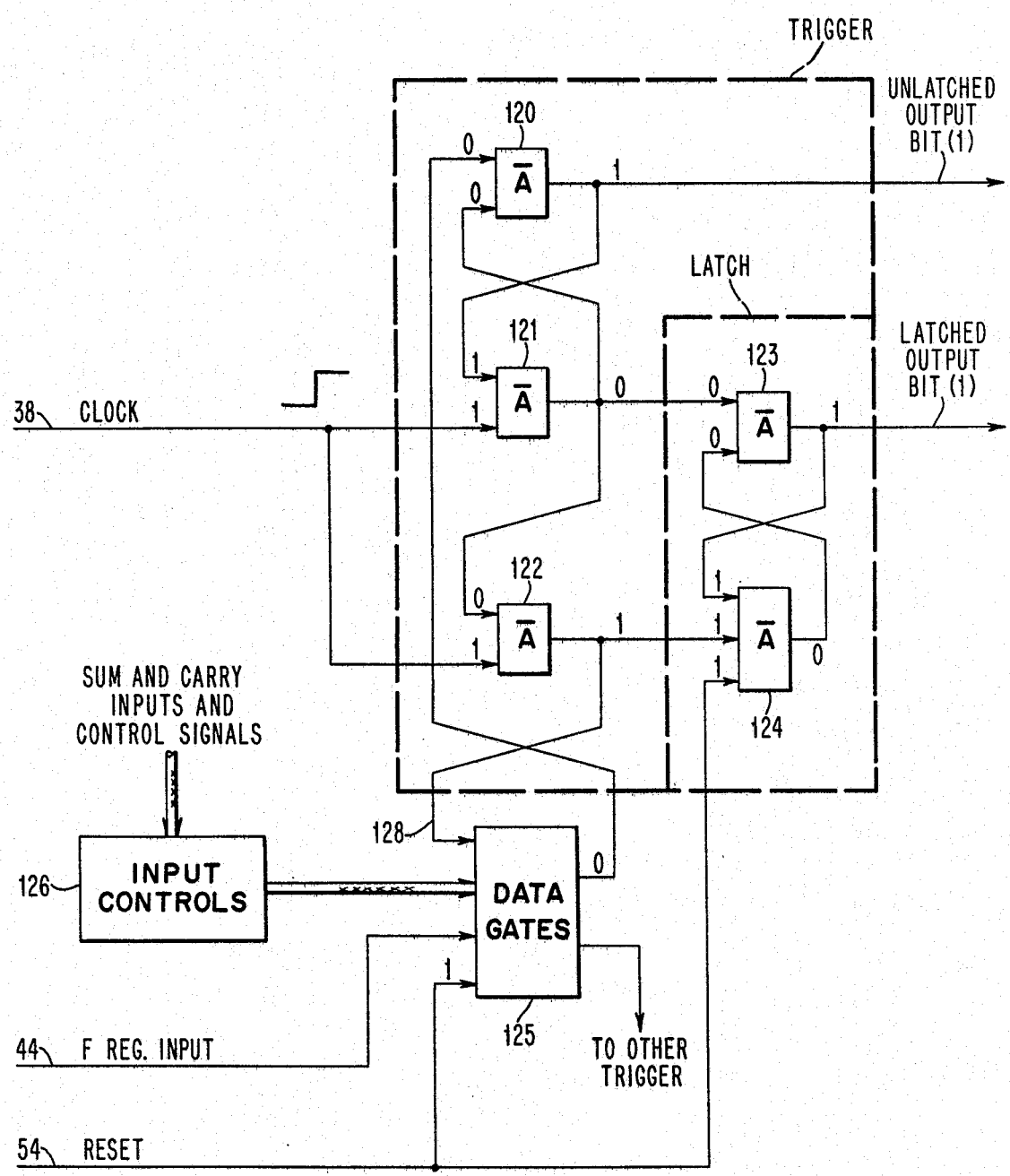

If a 0 appears at the output of data gates 125, it is applied as input to gate 120, thereby causing the output of this gate to be 1, as shown in FIG. 15. Gate 120 thus produces an unlatched output bit of 1, and it also applies this 1 bit as input to gate 121, as shown in FIG. 15. When the clock line is pulsed, this applies a 1 clock input to gate 121, thereby causing both inputs to gate 121 to have 1 values, FIG. 15. The output of gate 121 therefore is 0, which is applied as input to gate 123, causing gate 123 to produce a latched output 1 bit. The 0 output from gate 121 also is applied as input to gate 122, causing the latter to have its normal 1 output, which enables gate 124 to assume a state complementing that of gate 123. The gates 123 and 124 maintain this stable state at least until the next clock pulse, despite any changes that may occur meantime in the value of the unlatched output bit.

The foregoing description explains how the triggers operate. Referring now to FIG. 12, the NAND gates 130–136 therein shown correspond to the input control section 126 of the CSA bit position as shown in FIG. 13. The gates 138–144, FIG. 12, correspond to the data gates 125, FIG. 13. The NAND gates 145–149, FIG. 12, provide a sum trigger circuit configuration functionally corresponding to that provided by the gates 120–124 in FIG. 13. The carry trigger circuit configuration comprising NAND gates 150–154, FIG. 12, similarly provides a counterpart of the one provided by gates 120–124 in FIG. 13.

No attempt will be made herein to describe in complete detail all of the actions that take place within the various parts of the complex circuitry shown in FIG. 12 under all possible conditions. However, certain key actions will be described, and the status of all the data gates and trigger gates will be tabularly presented for each of the possible combinations of input bits during the various functions performed by the CSA (add, right shift, left shift, complement). These presentations, when considered in connection with the explanations previously given hereinabove, will provide an adequate disclosure of the carry save adder operations.

Add

Add functions are performed with or without the F register gated to the CSA. If the F register is degated, there will be a zero input on the F register line 44, FIG. 12. Otherwise the line 44 will supply to the CSA bit position N an input bit $F_N$ from the N'th order of the divisor stored in the F register.

To initiate an add operation, the control line 40 is energized. This conditions the NAND gates 131 and 134 to produce outputs which are the ones-complements of the carry bit $C_{N+1}$ on line 42 and the sum bit $S_N$ on line 41, respectively. The output of gate 131 is applied to one of the junctions of a negative DOT OR network 156. A network of this kind is so constituted that if any input to the network is negative, the output of the network will be negative. In similar fashion the output of gate 134 is applied to one of the junctions of a negative DOT OR network 158. The two outputs of the DOT OR networks 156 and 158 are applied to a NOR gate 139 and also to a NAND gate 138. The arrangement is such that if the original sum and carry input bits have equal values, then the respective outputs of the gates 138 and 139 have equal values corresponding to those original input values. If the input sum and carry bits have different values, then the NAND gate 138 has a positive (1) output value, and the NOR gate 139 has a negative (0) output value.

Input from the F register line 44, FIG. 12, is applied to the data gates 140, 142 and 144 when the F register is gated to the CSA. If the F register is degated from the CSA, the line 44 supplies dummy inputs of zero to these gates. During an add operation in which the divisor is involved (that is to say, a complemental subtraction), the F register line 44 supplies to each CSA bit position N the divisor bit $F_N$ registered in the corresponding position N of the F register.

The input control gates 130, 132, 133, 135 and 136, FIG. 12, have passive roles during an add operation. Since the various control lines connected to these NAND gates are not energized in the present instance, these gates tend to have positive (1) outputs. However, if the input data bit that is fed to either one of the active gates 131 and 134 is a 1, then the output of this gate will be negative (0), causing the entire DOT OR network 156 or 158 (as the case may be) to go negative. Hence the inactive control gates 130, 132, 133, 135 and 136 are unable to affect the inputs that are supplied from the add control gates 131 and 134 to the NAND gate 138 and NOR gate 139.

Rather than describe all of the actions which take place within the various gates shown in FIG. 12 during an add operation, there will be presented below a table that shows the respective outputs furnished by the data gates 138–144, trigger gates 145–154 and DOT OR gates 156 and 158 for each possible combination of sum input, carry input and divisor input bits. Some of these states are represented as they are under the conditions which exist only when the clock pulse is being applied to the CSA, as noted on the chart. With some slight modifications, this same table also will serve to depict the gate actions for the other CSA functions (right and left shifts and complement-sum), as described hereinafter.

| TABLE OF GATE OUTPUTS FOR ADD OPERATION | | | | | | | | |
|---|---|---|---|---|---|---|---|---|
| Inputs to CSA Bit Position N | | | | | | | | |
| Sum Input $(S_N)$ | 0 | 1 | 0 | 1 | 0 | 1 | 0 | 1 |
| Carry Input $(C_{N+1})$ | 0 | 0 | 1 | 1 | 0 | 0 | 1 | 1 |
| Divisor Input $(F_N)$ | 0 | 0 | 0 | 0 | 1 | 1 | 1 | 1 |
| Gate Outputs | | | | | | | | |
| DOR OR 156 | 1 | 1 | 0 | 0 | 1 | 1 | 0 | 0 |
| DOT OR 158 | 1 | 0 | 1 | 0 | 1 | 0 | 1 | 0 |
| NAND 138 | 0 | 1 | 1 | 1 | 0 | 1 | 1 | 1 |
| NOR 139 | 0 | 0 | 0 | 1 | 0 | 0 | 0 | 1 |
| NAND 140 | 1 | 1 | 1 | 1 | 0 | 0 | 0 | 0 |
| " 141 | 1 | 1 | 1 | 0 | 1 | 1 | 1 | 0 |
| " 142 | 1 | 1 | 1 | 1 | 1 | 1 | 1 | 0 |
| " 143 | 1 | 0 | 0 | 1 | 1 | 1 | 1 | 1 |
| " 144 | 1 | 1 | 1 | 1 | 0 | 1 | 1 | 1 |
| $PS_N$ " 145 | 0 | 1 | 1 | 0 | 1 | 0 | 0 | 1 |
| " 146 | 1 | 0* | 0* | 1 | 0* | 1 | 1 | 0* |
| " 147 | 0* | 1 | 1 | 0* | 1 | 0* | 0* | 1 |

| | | 148 | 0 | 1 | 1 | 0 | 1 | 0 | 0 | 1 |
|---|---|---|---|---|---|---|---|---|---|---|
| $S_N$ | " | 149 | 1 | 0 | 0 | 1 | 0 | 1 | 1 | 0 |
| $PC_N$ | " | 150 | 0 | 0 | 0 | 1 | 0 | 1 | 1 | 1 |
| | " | 151 | 1 | 1 | 1 | 0* | 1 | 0* | 0* | 0* |
| | " | 152 | 0* | 0* | 0* | 1 | 0* | 1 | 1 | 1 |
| $C_N$ | " | 153 | 0 | 0 | 0 | 1 | 0 | 1 | 1 | 1 |
| | " | 154 | 1 | 1 | 1 | 0 | 1 | 0 | 0 | 0 |

*Only at clocking time; otherwise 1.

The latch gates 148, 149, 153 and 154 which furnish the sum and carry outputs retain their settings after the clock pulse has terminated and the data inputs have been withdrawn. The trigger gates 145 and 150 which furnish the presum and precarry outputs will return to all-zero output states when the data inputs are withdrawn, since it is not necessary that they maintain any significant outputs once the lookahead function has been accomplished. The trigger gates 146, 147, 151 and 152 return to all-1 output states when the clock pulse terminates.

SHIFT

Right and left shift operations are special types of add operations, which differ from the normal add operation described above only in that the sum and carry input bits are derived from different bit positions, and the divisor input is always zero (F register degated). To execute a right shift, for instance (FIG. 2), the "Shift Carry L0 Sum R1" control line 50, FIGS. 6 and 12, is energized, thereby conditioning the NAND gate 130, FIG. 12, to furnish a negative (0) output if the carry input bit ($C_N$ in this case) is 1, or a positive (1) output if $C_N$ is 0. Similarly, the energization of control line 50 also conditions NAND gate 133 to produce a 0 output if the sum input bit ($S_{N-1}$) is 1, or vice versa. Any zero output bit or bits produced by gates 130 and 133 will be passed by the negative DOT OR networks 156 and/or 158 to the NOR gate 139 and/or NAND gate 138. From here on, the data gates and trigger gates function in the same way as described previously to produce the final presum ($PS_N$), precarry ($PC_N$), sum ($S_N$) and carry ($C_N$) output bits from the CSA bit position N here being considered.

The "Table of Gate Outputs for Add Operation" presented hereinabove is also applicable to a right shift operation, provided the following modifications are made in this table:

a. The sum input bit in this instance is $S_{N-1}$ rather than $S_N$, and the carry input bit is $C_N$ rather than $C_{N+1}$.

b. Any columns containing input bit combinations in which the divisor bit ($F_N$) is 1 should be disregarded, since they are inapplicable to the shift operation here being considered.

The sum and carry output bits produced by this right shift action are clocked into the sum and carry latches.

A left shift (FIG. 3) is executed by energizing the "Shift Carry L1 Sum L2" control line 46, FIGS. 6 and 12, thereby conditioning the NAND gate 132, FIG. 12, to produce a 0 output if the carry input bit ($C_{N+2}$ in this case) is 1, or a 1 output if $C_{N+2}$ is zero. Energization of line 46 also conditions NAND gate 135 to produce a 0 output if the sum input bit ($S_{N+1}$) is 1, or otherwise producing a 1 output. Any zero (i.e., negative) output bit or bits produced by gates 132 and 135 will be passed by the negative DOT OR networks 156 and/or 158 to the NAND gate 138 and NOR gate 139. From this point on the functioning of the data gates and trigger gates is the same as described previously for an add operation, provided the following modifications are made in the above "Table of Gate Outputs for Add Operations":

a. The sum input bit in this instance is $S_{N+1}$ rather than $S_N$, and the carry input bit is $C_{N+2}$ rather than $C_{N+1}$.

b. Any columns containing input combinations in which the divisor bit $F_N$ is 1 should be disregarded.

The sum and carry output bits produced by this left shift action are clocked into the sum and carry latches.

COMPLEMENT SUM

As mentioned hereinabove, there may be occasions when it is desired to obtain the complement of the number registered in the sum latches 26 of the CSA at the conclusion of an arithmetic operation. When this result is desired, the "Complement Sum" control line 56, FIGS. 6 and 12, is energized. This conditions the NAND gate 136, FIG. 12, of each CSA bit position N to produce an output which is the inverted form of the complemental sum bit $S_N$ then registered in the sum latch $26_N$ of the respective CSA bit position. This complemental sum bit is fed from the output of latch gate 149, FIG. 12 (which stores the complement of $S_N$) through a line 160 to the sum input terminal of gate 136. The output of gate 136, which represents the value of the sum bit $S_N$ then stored in the sum latch, is fed through the DOT OR network to the gates 138 and 139.

In a sum complementing operation, there is no significant carry input or divisor input. Since the carry input is zero, the output of the DOT OR network 156 is 1, which is applied to gates 138 and 139 for thereby conditioning these gates in such fashion that when the value of $S_N$ is zero, gate 138 produces a 1 output and gate 139 produces a 0 output, but when the value of $S_N$ is 1, gate 138 produces a 0 output while gate 139 produces a 1 output. As the end result, the output value that eventually is clocked into the sum latch $26_N$ is the complement of the sum bit $S_N$ that previously had been stored there.

The outputs of the data gates and trigger gates, FIG. 12, when a Complement Sum function is being performed by the CSA can be represented by the above "Table of Gate Outputs for Add Operation" provided this table is modified as follows:

a. All columns in which the carry input and/or divisor input is 1 should be disregarded.

b. In each of the remaining two columns, the sum input is the complement of the sum bit $S_N$ initially registered in the sum latch.

RESET

During a reset, the control line 54 is pulsed negatively, thereby causing each of the NAND gates 141, 143, 149 and 154, FIG. 12, to assume a state in which it manifests a positive (1) output, if it has not already been put into that state. Such actions in turn cause the NAND gates 148 and 153 to assume their "output 0" states, thus resetting all sum and carry latches, and it also insures that the NAND gates 145 and 150 likewise are in states where they will manifest zero presum and precarry outputs.

SUMMARY OF ADVANTAGES

Recapitulating those portions of the foregoing description wherein the novel and useful features of this invention have been emphasized, the disclosed divider apparatus and its carry save adder (CSA) offer the following advantages over conventional dividers and carry save adders:

1. The divider uses the same high-speed carry save adder that is used in multiplying operations, thereby making it unnecessary to provide the processor with separate adders for performing multiplication and division.
2. The divider will not attempt to perform any complemental subtraction involved in the division process unless there is 100% certainty that the proposed subtraction can be performed without causing an overdraft.
3. Whether the proposed subtraction can or cannot be successfully performed is determined beforehand by a logical lookahead procedure that adds negligible time to the subtraction cycle if the subtraction actually is performed and saves the time that otherwise would be wasted in attempting a performance of the subtraction if the attempt would fail.
4. The carry save adder furnishes unlatched presum and precarry bits which are used in the lookahead procedure, and it separately furnishes latched sum and carry bits which are not subject to change between clock pulses, despite changes of input data that may occur during the intervening period.
5. Only one carry save adder is utilized to effect all of the functions that may be involved in dividing and/or multiplying operations, including add, subtract, right shift, left shift and complement functions, and all of these functions may be built into a unitary CSA circuit configuration as shown herein.
6. Compact CSA circuit design is achieved by the use of edge-triggered flip-flops ("edge triggers") and data gates which respond to sum and carry inputs respectively furnished by sum latches and carry latches of these same edge triggers, along with any other input data to the CSA such as a divisor, to register new sum and carry outputs in said latches and provide new presum and precarry bits that are not latched.
7. The input gates of the CSA are adapted to route input data through the other gates and trigger circuits of the CSA according to the particular type of CSA function being performed (add, right shift, left shift, complement). Separate shift or complement circuitry is not needed.
8. Through appropriate microprogramming, functions separately described herein can be combined in some instances to reduce operating time. For instance, a left shift function (FIG. 3) can be combined with a lookahead add function (FIG. 5) so that presum and precarry bits generated by the left shift are used immediately in the lookahead following shift.

Effective use of the invention does not necessarily require that every one of these advantages be incorporated in a given embodiment. Modifications and variations of the disclosed embodiment can be made without departing from the spirit of the invention, as expressed in the following claims.

We claim:

1. In an arithmetic apparatus including a carry save adder for performing division as a series of complemental subtractions, said adder being adapted to receive first and second input bit strings that respectively consist at least in part of sum bits and carry bits previously manifested at the output of said adder and a third input bit string which in some instances will represent a divisor, said adder being operable in response to such inputs for manifesting sum and carry output bit strings and having sum output and carry output storage devices into which selected ones of the sum and carry output strings manifested by said adder are respectively entered for subsequent use in the operations of said adder, each of said subtractions involving a minuend value jointly represented by sum and carry output bit strings already stored in said adder output storage devices, and a subtrahend value represented by the bits of the divisor as included in said third input bit string, one of said minuend and subtrahend values being in complement form and the other being in true form, an improved feature of said apparatus comprising:

first logical network means responsive to the bits stored in certain of said sum and carry output storage devices and to certain of the bits manifested in said sum and carry output bit strings when the divisor is absent from the adder inputs for logically determining the value of the bit in the highest order of the minuend value which is to be used in a currently proposed subtraction, said highest minuend order being to the left of the highest order in said input bit strings, second logical network means responsive to the sum and carry output bit strings manifested by said adder when the divisor is included in the adder inputs for logically determining the value of the carryout bit produced by complemental subtraction of the divisor from the value jointly represented by the first and second input bit strings, without causing the result of that subtraction to be entered into said adder output storage devices, said carryout bit being in an order higher than the highest order of said input bit strings, and third logical network means jointly responsive to the leftmost minuend bit value determined by said first logical network means and the carryout bit value determined by said second logical network means for producing a signal to indicate whether or not the currently proposed complemental subtraction can be performed without an overdraft and accordingly whether or not the sum and carry output bit strings manifested by said adder as the result of that subtraction should be entered into said sum and carry output storage devices for subsequent use by said adder.

2. Arithmetic apparatus for performing a division of a first operand by a second operand according to a carry save addition process that involves a series of sum determinations, at least some of which include a logical procedure for ascertaining the consequences of adding together three bit strings, the first of said bit strings representing alternatively an initial complement of said first operand or sum bits that were generated by a previous addition of bit strings during the execution of said process, the second of said three bit strings representing alternatively an initial string of zero bits or carries that have resulted from said previous addition, the third of said three bit strings representing said second operand, said apparatus comprising:

first storage means for storing the first of the three bit strings involved in a current sum determination, second storage means for storing the second of the three bit strings involved in a current sum determination, said first and second bit strings together representing a current minuend complement value, third storage means for storing the third of the three bit strings involved in a current sum determination, first logical means for determining from the bit strings stored in said first and second storage means the highest-order bit of the current minuend complement that would be produced by addition of these bit strings, such highest order being to the left of the highest order in said bit strings, second logical means for determining from the bit strings currently stored in said first, second and third storage means the ultimate carryout bit that would result from such addition if it actually were performed, such carryout bit being in an order higher than the highest order of said bit strings, and third logical means for ascertaining from the values of the bits that have been determined respectively by said first and second logical means whether an addition of said three bit strings would successfully accomplish a proposed complemental subtraction of the second operand from the current minuend, said third logical means including a device for furnishing an output signal that denotes whether or not an overdraft would result from the proposed complemental subtraction and therefore whether or not the sum and carry bits generated by such subtraction may be used in a subsequent subtraction, if any.

3. In an arithmetic apparatus which is adapted at least in part to perform division as a series of complemental subtractions, wherein either the minuend or subtrahend of each subtraction is represented in complement form, the improvement comprising:

a combinatorial adder for producing outputs in the form of a sum bit string and an associated carry bit string in response to coincident input bit strings, wherein a first one of said input bit strings may include bits from a sum bit string already available as an output of said adder, and wherein a second one of said input bit strings may include bits from a carry bit string already available as an output of said adder, and wherein a third one of said input bit strings may alternatively represent, under different conditions, a divisor which is to serve as the subtrahend or an input having no numerical significance, sum storage means for storing sum bits produced by said adder which are to be made available for subsequent inclusion in a sum input bit string supplied to said adder or for some other purpose, carry storage means for storing carry bits produced by said adder which are to be made available for subsequent inclusion in a carry input bit string supplied to said adder or for some other purpose, and a logical network responsive to sum and carry bits produced by said adder which are available in said sum and carry storage means and/or otherwise are available at the output of said adder for determining whether or not an overdraft would be the logical result of complementally subtracting the divisor from a minuend value represented by given sum and carry input bit strings supplied to said adder, said network including a device which furnishes a signal to indicate whether or not the proposed complemental subtraction can be performed without causing an overdraft and therefore whether or not said sum storage means and said carry storage means should be conditioned to receive the respective sum and carry outputs that would result from the performance of that subtraction.

4. The improvement recited in claim 3 wherein said adder operates in part under the control of clock pulses supplied thereto by said arithmetic apparatus, said adder including:

elements providing paths through which sum and carry output bit strings produced by said adder may be entered respectively into said sum storage means and said carry storage means, said elements being controlled by said clock pulses so that only those sum and carry bits which are produced by said adder in time coincidence with one of said clock pulses are able to pass through said paths to said sum and carry storage means, and other elements providing paths through which sum and carry output bits produced by said adder are able to enter said logical network independently of said sum and carry storage means and irrespective of the time relationship between these bits and said clock pulses.

5. In an arithmetic apparatus for performing division as a series of complemental subtractions wherein the operands are represented respectively in true and complement forms, said apparatus including a source of clock pulses for timing certain of its functions, the combination of:

a register operable in alternative modes to furnish an output bit string representing one of said operands or a dummy bit string in lieu thereof;

a carry save adder having ordered bit positions each capable of receiving three concurrent binary inputs and producing two sets of binary outputs, the first of said binary output sets at each bit position including a sum bit and a carry bit, and the second of said binary output sets at each bit position including a presum bit and a precarry bit, there being at each of said bit positions a sum latch and a carry latch, said adder being operable to store in the sum latches of its various bit positions a bit string initially representing the other of said operands and thereafter being operable normally for causing the sum latches and carry latches of said bit positions to store the respective sum bits and carry bits in said first set of outputs which are produced by said adder in time coincidence with one of the clock pulses applied to said adder and to retain such stored sum and carry bits unchanged until a subsequent clock pulse is applied to said adder notwithstanding any changes that may occur in the input data during the interval between such clock pulses, said adder also enabling the presum bits and precarry bits in said second set of adder outputs to be made available directly without storage thereof in said latches and further enabling such presum and precarry outputs to change in response to changes of the input data;

addition control means operable to condition each of said adder bit positions so that it receives as its respective inputs a sum bit from the output sum latch at that same bit position and a carry bit from the output carry latch at the bit position in the next lower order, if any, and being effective also whenever the result of a proposed complemental subtraction is to be ascertained for causing each of said bit positions to receive from said register, as a third input, a bit in the corresponding order of said one operand; and a logical network responsive to certain of the sum and carry bits already stored in said sum and carry latches and responsive also to the presum and precarry bits which currently are being manifested by said adder for controlling the operation of said adder so that said sum latches and carry latches are not enabled to store the potential result of a proposed subtraction when the current inputs to said bit positions will not permit the proposed subtraction to be performed without an overdraft;

said adder being effective under control of said addition control means and in response to a clock pulse when said logical network does not detect a potential overdraft condition for causing the new sum and carry output bits to be stored in said sum and carry latches for thereby representing the result of complementally subtracting said one operand from the minuend jointly represented by the sum and carry input bit strings that were entered concurrently with the bits of said one operand into said adder.

6. The combination recited in claim 5 further comprising:

left shift control means operable prior to each complemental subtraction performed or attempted by said apparatus for conditioning each of said adder bit positions so that it receives as its respective inputs a sum bit from the output sum latch at the bit position of next lower order, if any, and a carry bit from the output carry latch at the bit position of second lower order, if any, and being effective also for causing each of said bit positions to receive as its third input a bit in the said dummy bit string;

said adder being operable under control of said left shift control means and in response to a clock pulse for causing the resultant sum and carry bits to be stored in said sum and carry latches, thereby effecting a left shift of the value that was jointly represented by the initial sum and carry bit strings so that such value may serve as the minuend in the approaching subtraction attempt.

7. The combination recited in claim 6 wherein said logical network comprises:

a first set of logical elements responsive to the sum and carry bits stored in certain of said sum and carry output latches and to the presum and precarry bits produced by said adder when it is receiving said dummy bit string as its third input for detecting the value of the sum bit that effectively would be shifted out left of the highest-order bit position in said adder if said sum and carry bits actually were combined to form a single minuend bit string prior to left shift thereof, a second set of logical elements responsive to the presum bits and precarry bits produced by said adder when the bit positions thereof are receiving said dummy bit string and again when said bit positions are receiving said operand bit string for determining the value of the carryout bit which will result when the subtrahend represented by said one operand is complementally subtracted from the minuend jointly represented by the sum and carry input bit strings concurrently being received by said adder bit positions, and a third set of logical elements responding to the outputs of said first and second sets of logical elements for determining from the values of said sum bit shifted out left and said carryout bit whether or not a complemental subtraction of said subtrahend from said minuend can be performed without an overdraft.

8. The combination recited in claim 7 wherein said first and second sets of logical elements have the following common structure responsive to said presum and precarry bits:

groups of logical elements, each such group of elements corresponding to a respective group of adjacent bit positions in said adder, for determining from the related presum and precarry bit patterns whether or not said respective group of bit positions could produce a significant carryout having its origin within that group if an actual addition of presum bits and precarry bits were to occur, other groups of logical elements, each such other group of elements corresponding to a respective group of adjacent bit positions in said adder, for determining from the related presum and precarry bit patterns whether or not said respective group of bit positions could propagate a significant carryout having its origin in another group of bit positions lower in rank if an actual addition of presum bits and precarry bits were to occur, and still other logical elements responsive at least in part to the groups and other groups of logical elements recited above for determining whether or not said adder as whole could produce a significant carryout from the highest-order bit position thereof if an actual addition of the input values which produced said presum and precarry bit patterns in all of said groups were to occur.

9. The combination recited in claim 5 further comprising:

right shift control means operable prior to the performance of said series of subtractions for conditioning each of said adder bit positions so that it receives as its respective inputs a carry bit from the output carry latch at that same bit position, and a sum bit from the output sum latch at the bit position of next higher order, if any, and being effective also for causing each of said bit positions to receive as its third input a bit in said dummy bit string;

said adder being operable under control of said right shift control means and in response to a clock pulse for causing the resultant sum and carry bits to be stored in said sum and carry latches thereby effecting a right shift of the value that was jointly represented by the initial sum and carry bit strings.

10. The combination recited in claim 5 further comprising:

sum complementing control means operable when a final remainder value has been stored in said sum latches for conditioning each of said adder bit positions so that it receives as its respective sum input the complement of the sum bit stored in the output sum latch stored at the same bit position, and as its other two inputs it receives zeros;

said adder being operable under control of said sum complementing control means and in response to a clock pulse for causing the resultant sum complement bits to be stored in said sum latches, thereby complementing the sum previously stored there.

11. Carry lookahead apparatus for use with a carry save adder to determine the ultimate carryout that would result from the addition of the sum bits and carry bits manifested as separate outputs at the respective bit positions of said adder, said apparatus comprising:

groups of logical elements, each such group of elements corresponding to a respective group of adjacent bit positions in said adder, for determining from the related patterns of sum bits and carry bits whether or not said respective group of bit positions could produce a significant carryout having its origin within that group if an actual addition of said sum bits and carry bits were to occur, other groups of logical elements, each such group of elements corresponding to a group of adjacent bit positions in said adder, for determining from the related patterns of sum bits and carry bits whether or not said respective group of bit positions could propagate a significant carryout having its origin in another group of bit positions lower in rank if an actual addition of said sum bits and carry bits were to occur, and additional logical means responsive at least in part to the groups and other groups of logical elements recited above for determining whether or not said adder as a whole could produce a significant carryout from the highest-order bit position thereof if an actual addition of all the sum bits and carry bits manifested by said adder were to occur.

12. Apparatus as recited in claim 11 wherein said additional logical means is responsive also to the carry bit manifested in the bit position of highest order in said adder, being effective to determine from the value of said highest-order carry bit and the presence or absence of a significant group carryout from the highest-ranking group of bit positions whether or not there would be a significant carryout from the highest-order bit position of said adder as a whole if an actual addition of all the sum bits and carry bits manifested by said adder were to occur.

* * * * *

UNITED STATES PATENT AND TRADEMARK OFFICE
CERTIFICATE OF CORRECTION

PATENT NO. : 4,084,254             Page 1 of 2

DATED : April 11, 1978

INVENTOR(S) : Birney et al

It is certified that error appears in the above-identified patent and that said Letters Patent are hereby corrected as shown below:

Column 18, line 24, "and", first occurrence, should read --the--.

Column 23, line 66, "advisor" should read --divisor--.

Column 25, line 48, "it" should read --if--.

Column 26, line 32, "inverted carryout value (complement of COLA2 V" should read --inverted SUMOL bit therefore is 1, and it is effective--.

Column 26, line 34, after "COLA2" insert --∀--.

Column 29, line 15 of EXAMPLE TWO, "$S_0$ V $C_1$" should read --$S_0$ ∀ $C_1$--.

Column 29, line 30 of EXAMPLE TWO, "SUMOL V" should read --SUMOL ∀--.

Column 29, line 41 of EXAMPLE TWO, "COLA2 V" should read --COLA2 ∀--.

Column 31, line 21, "A and OR" should read --$\overline{A}$ and $\overline{OR}$--.

Column 34, line 60, "DOR" should read --DOT--.

Column 36, line 22, "$S_N$" should read --$\overline{S_N}$--.

UNITED STATES PATENT OFFICE
CERTIFICATE OF CORRECTION

Patent No. 4,084,254      Dated   April 11, 1978

Inventor(s) Birney et al

It is certified that error appears in the above-identified patent and that said Letters Patent are hereby corrected as shown below:

Front Page indicating "12 Claims, 12 Drawing Figures" should read
--12 Claims, 15 Drawing Figures--.

Signed and Sealed this

Third Day of October 1978

[SEAL]

Attest:

RUTH C. MASON
*Attesting Officer*

DONALD W. BANNER
*Commissioner of Patents and Trademarks*